US011869078B2

(12) United States Patent
Acuña-Rohter et al.

(10) Patent No.: US 11,869,078 B2
(45) Date of Patent: *Jan. 9, 2024

(54) SYSTEMS AND METHODS FOR CALCULATING A LATENCY OF A TRANSACTION PROCESSING SYSTEM

(71) Applicant: Chicago Mercantile Exchange Inc., Chicago, IL (US)

(72) Inventors: Jose Antonio Acuña-Rohter, Des Plaines, IL (US); Paul Callaway, Evanston, IL (US); Kyle D. Kavanagh, Chicago, IL (US); Christopher Walsh, Blue Island, IL (US); Sherry Bryant, Chicago, IL (US); Elisa Lugo, Chicago, IL (US); Joshua Hoffberg, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 196 days.

This patent is subject to a terminal disclaimer.

(21) Appl. No.: 17/231,407

(22) Filed: Apr. 15, 2021

(65) Prior Publication Data

US 2021/0233173 A1      Jul. 29, 2021

Related U.S. Application Data

(63) Continuation of application No. 14/879,614, filed on Oct. 9, 2015, now Pat. No. 11,010,833.

(51) Int. Cl.
*G06Q 40/10* (2023.01)
*G06Q 40/04* (2012.01)
*G06Q 20/10* (2012.01)

(52) U.S. Cl.
CPC .............. *G06Q 40/04* (2013.01); *G06Q 20/10* (2013.01)

(58) Field of Classification Search
CPC ....................................................... G06Q 20/10
(Continued)

(56) References Cited

U.S. PATENT DOCUMENTS 5,872,976 A    2/1999  Yee
7,831,491 B2   11/2010 Newell et al.
(Continued)

FOREIGN PATENT DOCUMENTS

EP      2312445 A1      4/2011
WO      WO-03063419 A1 *  7/2003   ........... H04L 41/145

OTHER PUBLICATIONS

Authors: Enrico Tedeschi et a; Title: Predicting Transaction Latency with Deep Learning in Proof-of-Work Blockchains; IEEE Xplore; Date Added to IEEE Xplore: Feb. 24, 2020 (Year: 2020).*

(Continued)

*Primary Examiner* — Bruce I Ebersman
*Assistant Examiner* — Hatem M Ali
(74) *Attorney, Agent, or Firm* — Lempia Summerfield Katz LLC

(57) ABSTRACT

A method for generating a prediction of a latency of a transaction processing system includes: sampling a first plurality of messages from a database that stores data indicative of messages previously processed by the transaction processing system including a characteristic and a processing time of each previously processed message; generating latency tables based upon the characteristics and the processing times of the sampled first plurality of messages; determining a characteristic of each of a second plurality of messages being processed by the transaction processing system; selecting, for each of the second plurality of messages, a latency table from the plurality of latency tables based upon the respective determined characteristic; simulating a processing time for each of the second plurality (Continued)

of messages based upon the respective selected latency table; and generating a latency prediction for the transaction processing system based upon the simulated processing times for the second plurality of messages.

23 Claims, 11 Drawing Sheets

(58) Field of Classification Search
USPC .......................................................... 705/37
See application file for complete search history.

(56) References Cited

U.S. PATENT DOCUMENTS

| | | | |
|---|---|---|---|
| 7,886,046 B1 | 2/2011 | Zeitoun | |
| 2005/0096999 A1 | 5/2005 | Newell et al. | |
| 2008/0120625 A1 | 5/2008 | Clark et al. | |
| 2009/0254525 A1* | 10/2009 | Srinivasan | G06F 16/252 |
| 2015/0127513 A1* | 5/2015 | Studnitzer | G06Q 40/04 |
| | | | 705/37 |
| 2015/0161727 A1 | 6/2015 | Callaway et al. | |

OTHER PUBLICATIONS

Authors: Diego Rughetti et al; Title: Machine Learning-Based Self-Adjusting Concurrency in Software Transactional Memory Systems; IEEE Xplore; Date Added to IEEE Xplore: Sep. 13, 2012 (Year: 2012).*
International Search Report and Written Opinion from, PCT/US2016/055433, dated Jan. 24, 2017, WO.

* cited by examiner

SYSTEMS AND METHODS FOR CALCULATING A LATENCY OF A TRANSACTION PROCESSING SYSTEM

REFERENCE TO RELATED APPLICATIONS

This application is a continuation under 37 C.F.R. 1.53(b) of U.S. patent application Ser. No. 14/879,614 filed Oct. 9, 2015, now U.S. Pat. No. 11,010,833, which is hereby incorporated by reference in its entirety and relied upon.

BACKGROUND

A match engine is a key component of a financial instrument trading system, such as a futures exchange, such as the Chicago Mercantile Exchange Inc. (CME). The match engine is a transaction processing system that processes a high volume, e.g., millions, of contracts or trades in one day. The contracts or trades are typically submitted in messages communicated to and from market participant computers. Exchange match engine systems may be subject to variable messaging loads due to variable market messaging activity. Performance of a match engine depends to a certain extent on the magnitude of the messaging load and the work needed to process that message at any given time. An exchange match engine may process large numbers of messages during times of high volume messaging activity. With limited processing capacity, high messaging volumes may increase the response time or latency experienced by market participants. Exchanges and market participants seek to minimize response time, or latency, for order submissions and confirmations.

In addition to the high volume, e.g., millions, of orders matched by a match engine per day, a match engine may receive a large volume of undesirable messages that are submitted primarily to test or gain information about the match engine's latency. For example, traders may submit low-risk orders that are useful for the traders not only because of the contained order, but because the processing time provides an indication of the current match engine response times. For example, instead of submitting a full order, a trader may submit a small lot order to observe the current match engine response time. If the response time is acceptable to the trader, then the trader may submit the full order. This practice places unnecessary strain on the match engine by having to process the frequent and small orders, such as small low risk orders.

A trader may desire to assess current response times for many reasons. For example, a market participant may be trading in several markets at one time, and may require a response in a certain amount of time from one market so that the market participant can then decide whether to take a certain position in a different market. Depending on the overall market activity and current performance of the match engine, a trader may submit an order and observe a response in 100 microseconds. At another time, the trader might observe a response in 1 millisecond. This difference and uncertainty may present a risk of missing an opportunity to complete a trade strategy in a second market. Or, the difference and uncertainty in response time may indicate a low probability that an order would be filled at a desired price even in the same market. Thus, uncertain response times may deter traders from trading in the same or different, secondary markets.

If the match engine is experiencing high latency, there is no guarantee that a submitted order will be processed before the market drastically changes. Without accurate and timely information about the response time of a match engine, market participants assume a risk while orders are in-flight, and not yet serviced by the match engine. Sending extra, low risk messages may exacerbate the problem, because the match engine must process the additional messages that have little true trading value, and must provide additional data back to market participants. If the match engine could provide real time or near real time response time data to market participants, the overall efficiency and data throughput of the match engine and the financial trading system would improve.

"Futures" is a term used to designate contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price.

Typically, an exchange provides for a centralized "clearing house" through which trades made must be confirmed, matched, and settled each day until offset or delivered. The clearing house is an adjunct to an exchange, and may be an operating division of an exchange, which is responsible for settling trading accounts, clearing trades, collecting and maintaining performance bond funds, regulating delivery, and reporting trading data. The essential role of the clearing house is to mitigate credit risk. Clearing is the procedure through which the clearing house becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearing house.

Current financial instrument trading systems allow traders to submit orders and receive confirmations, market data, and other information electronically via electronic messages exchanged using a network. Electronic trading systems ideally attempt to offer a more efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

Electronic marketplaces attempt to achieve these goals by using electronic messages to communicate actions and related data of the electronic marketplace between market participants, clearing firms, clearing houses, and other parties. The messages can be received using an electronic trading system, wherein an action associated with the messages may be executed. For example, the message may contain information relating to an order to buy or sell a product in a particular electronic marketplace, and the action associated with the message may indicate that the order is to be placed in the electronic marketplace such that other orders which were previously placed may potentially be matched to the order of the received message. In this way the electronic marketplace may conduct market activities through electronic systems with minimized face-to-face interaction as was previously required in pit based trading systems.

DETAILED DESCRIPTION

Figure 1:
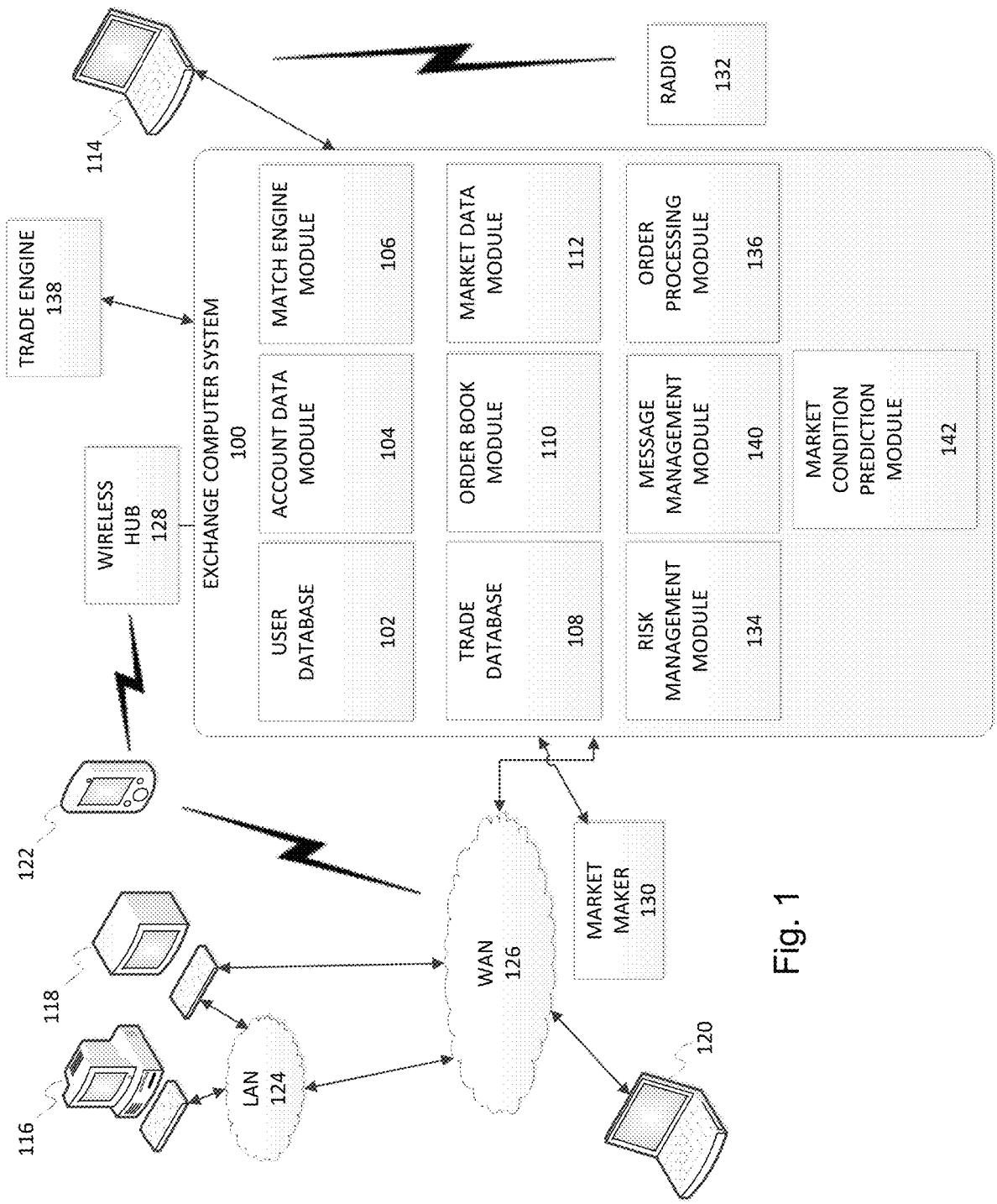
FIG. 1 depicts an illustrative computer network system that may be used to implement aspects of the disclosed embodiments.

The disclosed embodiments relate generally to the communication, management, and manipulation of electronic messages and the data contained therein. Specifically, the disclosed embodiments provide for particular configurations, and methods of operation, of systems for receiving and manipulating electronic messages as well as performing actions associated with the data contained therein. It may be desirable to provide market participants with accurate and actionable information about current response times to reduce the amount or cost of calculations and data transfer caused by unnecessary low risk messages. In applications where the architecture includes a processor preceded by a queue, it may be desirable to be able to accurately calculate how long a new message added to the queue would have to wait in the queue before being processed or serviced by the processor.

The disclosed methods and systems may be used for calculating or predicting message response time or latency estimates of a multi-stage transaction processing system, such as a match engine. The estimate of the transaction processing system response time may be published or distributed to market participants. A published response time data feed may reduce uncertainty for market participants. The system may also change market participant behavior such that submitting messages to understand or test response times will no longer be necessary, resulting in a reduction of the number of messages sent to the match engine. This reduced messaging load would result in increased performance of the match engine. Market participants would be able to better gauge expected response times. The disclosed systems and methods may improve market quality and transparency, as well as reduce low risk orders submitted to gain market latency information, which may place an unnecessary load on the engine. Fewer messages result in less computing power needed to run a given market segment, and latency will be reduced for incoming order messages.

In one embodiment, the disclosed systems may also represent a novel way to measure and/or predict performance, with respect to a particular transaction, of a transaction processing system, or portion thereof, which processes a dynamically varying volume of transactions, comprising heterogeneous transaction types, via a series of loosely coupled processing components, each of which may take a varying and/or unpredictable amount of time to complete its portion of the processing. The system generates processing time estimates for a yet to be processed transaction of a particular type by extrapolating from actual processing times of one or more previously processed transactions of the same type. The transaction processing system may be a multi-stage transaction processing system, e.g., including a queue coupled with a transaction component. In a financial exchange, the transaction component may perform or process matches.

The disclosed methods and systems may use a market data feed or some other mechanism for communicating the expected response time. The new market data message may be integrated with existing market data feeds, or may be presented in its own data feed. An exchange may output multiple market data feeds for multiple market segments. The system may calculate or predict an expected response time for each market segment. The message feed may be continuously disseminated at some predetermined time interval (e.g., 50 microseconds), or it could be triggered by incoming orders. They message feed may also be triggered by a change in the expected response time. The messages may be published out of band from the trading system so as to not increase the load on the critical path of the system. Alternatively, the response time message may be sent in response to a market participant "request for response time" message.

The contents of the response time message could include a minimal data set such as market segment, expected response time, and the time at which the response time was calculated. The response time message may also include an indicator as to whether the response time is increasing or decreasing over time.

The response time that is estimated could be the amount of time needed for the match engine to begin processing a message in the match component. Or, the response time that is estimated could be the amount of time needed for the match engine to process a message and publish match component results associated with that message in the match engine. Alternatively, the system may simply publish a queue size as an indicator of response time.

While the disclosed embodiments may be discussed in relation to futures and/or options on futures trading, it should be appreciated that the disclosed embodiments may be applicable to any equity, fixed income security, currency, commodity, options or futures trading system or market now available or later developed. It should be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. For example, an exchange must respond to inputs, such as trader orders, cancelations, etc., in a manner as expected by the market participants, such as based on market data, e.g., prices, available counter-orders, etc., to provide an expected level of certainty that transactions will occur in a consistent and predictable manner and without unknown or unascertainable risks. In addition, it should be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participant are met, e.g., that transactional integrity and predictable system responses are maintained.

As was discussed above, electronic trading systems ideally attempt to offer an efficient, fair and balanced market where market prices reflect a true consensus of the value of products traded among the market participants, where the intentional or unintentional influence of any one market participant is minimized if not eliminated, and where unfair or inequitable advantages with respect to information access are minimized if not eliminated.

The disclosed embodiments recognize that electronic messages such as incoming messages from market participants, e.g., trade order messages, etc., are sent from market participants, or their representatives, to an electronic trading or market system. For example, a market participant may submit an electronic message to the electronic trading system that includes an associated specific action to be undertaken by the electronic trading system, such as entering a new trade order into the market or modifying an existing order in the market.

As used herein, a financial message, or an electronic message, refers both to messages communicated by market participants to an electronic trading or market system and vice versa. The messages may be communicated using packeting or other techniques operable to communicate information between systems and system components. Some messages may be associated with actions to be taken in the electronic trading or market system. Financial messages communicated to the electronic trading system, also referred to as "inbound" messages, may include associated actions that characterize the messages, such as trader orders, order modifications, order cancelations and the like, as well as other message types. Financial messages communicated from the electronic trading system, referred to as "outbound" messages, may include messages responsive to inbound messages, such as confirmation messages, or other messages such as market update messages, quote messages, and the like.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereto, or rested. The response may further include a message to all market participants reporting a change in the order book due to the order. This response may take the form of a report of the specific change to the order book, e.g., an order for quantity X at price Y was added to the book (referred to as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order, also known as an immediate or cancel order, or other conditional request may not have an immediate market impacting effect, if at all, until the requisite conditions are met.

Accordingly, an acknowledgement or confirmation of receipt, e.g., a non-market impacting communication, may be sent to the trader simply confirming that the order was received. Upon the conditions being met and a market impacting result thereof occurring, a market-impacting message may be transmitted as described herein both directly back to the submitting market participant and to all market participants (in a Market By Price "MBP" or Market By Order "MBO" format). It should be appreciated that additional conditions may be specified, such as a time or price limit, which may cause the order to be dropped or otherwise canceled and that such an event may result in another non-market-impacting communication instead. As will be described below, in some implementations, market impacting communications may be communicated separately from non-market impacting communications, such as via a separate communications channel or feed.

It should be further appreciated that various types of market data feeds may be provided which reflect different markets or aspects thereof. Market participants may then, for example, subscribe to receive those feeds of interest to them. As market impacting communications usually tend to be more important to market participants than non-impacting communications, this separation may reduce congestion and/or noise among those communications having or reflecting an impact on a market or portion thereof. Furthermore, a particular market data feed may only communicate information related to the top buy/sell prices for a particular product, referred to as "top of book" feed, e.g., only changes to the top 10 price levels are communicated. Such limitations may be implemented to reduce consumption of bandwidth and message generation resources. In this case, while a request message may be considered market-impacting if it affects a price level other than the top buy/sell prices, it will not result in a message being sent to the market participants.

Examples of the various types of market data feeds which may be provided by electronic trading systems, such as the CME, in order to provide different types or subsets of market information or to provide such information in different formats include Market By Order, Market Depth (also known as Market by Price to a designated depth of the book), e.g., CME offers a 10-deep market by price feed, Top of Book (a single depth Market by Price feed), and combinations thereof. There may also be all manner of specialized feeds in terms of the content, i.e., providing, for example, derived data, such as a calculated index. Market data feeds may be characterized as providing a "view" or "overview" of a given market, an aggregation or a portion thereof or changes thereto. For example, a market data feed, such as a Market By Price ("MBP") feed, may convey, with each message, the entire/current state of a market, or portion thereof, for a particular product as a result of one or more market impacting events. For example, an MBP message may convey a total quantity of resting buy/sell orders at a particular price level in response to a new order being placed at that price. An MBP message may convey a quantity of an instrument which was traded in response to an incoming order being matched with one or more resting orders. MBP messages may only be generated for events affecting a portion of a market, e.g., only the top 10 resting buy/sell orders and, thereby, only provide a view of that portion. As used herein, a market impacting request may be said to impact the "view" of the market as presented via the market data feed.

An MBP feed may utilize different message formats for conveying different types of market impacting events. For example, when a new order is rested on the order book, an MBP message may reflect the current state of the price level to which the order was added, e.g., the new aggregate quantity and the new aggregate number of resting orders. As can be seen, such a message conveys no information about the resting orders, including the newly rested order, themselves to the market participants. Only the submitting market participant, who receives a separate private message acknowledging the event, knows that it was their order that was added to the book. Similarly, when a trade occurs, an MBP message may be sent which conveys the price at which the instrument was traded, the quantity traded and the number of participating orders, but may convey no information as to whose particular orders contributed to the trade. MBP feeds may further batch reporting of multiple events, i.e., report the result of multiple market impacting events in a single message.

Alternatively, a market data feed, referred to as a Market By Order ("MBO") feed, may convey data reflecting a change that occurred to the order book rather than the result of that change, e.g., that order ABC for quantity X was added to price level Y or that order ABC and order XYZ traded a quantity X at a price Y. In this case, the MBO message identifies only the change that occurred so a market participant wishing to know the current state of the order book must maintain their own copy and apply the change reflected in the message to know the current state. As can be seen, MBO messages carry much more data because they reflect any market impacting change. Furthermore, because specific orders, but not the submitting traders thereof, are identified, other market participants may be able to follow that order as it progresses through the market, e.g., as it is modified, canceled, traded, etc.

It should be appreciated that the number, type and manner of market data feeds provided by an electronic trading system are implementation dependent and may vary depending upon the types of products traded by the electronic trading system, customer/trader preferences, bandwidth and data processing limitations, etc. and that all such feeds, now available or later developed, are contemplated herein. As such, MBP and MBO feeds may refer to categories/variations of market data feeds, distinguished by whether they provide an indication of the current state of a market resulting from a market impacting event (MBP) or an indication of the change in the current state of a market due to a market impacting event (MBO).

Messages, whether MBO or MBP, generated responsive to market impacting events which are caused by a single order, such as a new order, an order cancelation, an order modification, etc., are fairly simple and compact and easily created and transmitted. However, messages, whether MBO or MBP, generated responsive to market impacting events which are caused by more than one order, such as a trade, may require the transmission of a significant amount of data to convey the requisite information to the market participants. For trades involving a large number of orders, e.g., a buy order for a quantity of 5000 which matches 5000 sell orders each for a quantity of 1, a significant amount of information may need to be sent, e.g., data indicative of each of the 5000 trades that have participated in the market impacting event.

Furthermore, each participating trader needs to receive a notification that their particular order has traded. Continuing with the example, this may require sending 5001 individual trade notification messages, or even 10,000+ messages where each contributing side (buy vs. sell) is separately reported, in addition to the notification sent to all of the market participants.

As detailed in U.S. patent application Ser. No. 14/100,788, the entirety of which is incorporated by reference herein, it may be recognized that trade notifications sent to all market participants may include redundant information repeated for each participating trade and a structure of an MBP trade notification message may be provided which results in a more efficient communication of the occurrence of a trade. The message structure may include a header portion which indicates the type of transaction which occurred, i.e., a trade, as well as other general information about the event, an instrument portion which comprises data about each instrument which was traded as part of the transaction, and an order portion which comprises data about each participating order. In one embodiment, the header portion may include a message type, Transaction Time, Match Event Indicator, and Number of Market Data Entries ("No. MD Entries") fields. The instrument portion may include a market data update action indicator ("MD Update Action"), an indication of the Market Data Entry Type ("MD Entry Type"), an identifier of the instrument/security involved in the transaction ("Security ID"), a report sequence indicator ("Rpt Seq"), the price at which the instrument was traded ("MD Entry PX"), the aggregate quantity traded at the indicated price ("ConsTradeQty"), the number of participating orders ("NumberOfOrders"), and an identifier of the aggressor side ("Aggressor Side") fields. The order portion may further include an identifier of the participating order ("Order ID"), described in more detail below, and the quantity of the order traded ("MD Entry Size") fields. It should be appreciated that the particular fields included in each portion are implementation dependent and that different fields in addition to, or in lieu of, those listed may be included depending upon the implementation. It should be appreciated that the exemplary fields can be compliant with the FIX binary and/or FIX/FAST protocol for the communication of the financial information.

The instrument portion contains a set of fields, e.g., seven fields accounting for 23 bytes, which are repeated for each participating instrument. In complex trades, such as trades involving combination orders or strategies, e.g., spreads, or implied trades, there may be multiple instruments being exchanged among the parties. In one embodiment, the order portion includes only one field, accounting for 4 bytes, for each participating order which indicates the quantity of that order which was traded. As will be discussed below, the order portion may further include an identifier of each order, accounting for an additional 8 bytes, in addition to the quantity thereof traded. As should be appreciated, data which would have been repeated for each participating order, is consolidated or otherwise summarized in the header and instrument portions of the message thereby eliminating redundant information and, overall, significantly reducing the size of the message.

While the disclosed embodiments will be discussed with respect to an MBP market data feed, it should be appreciated that the disclosed embodiments may also be applicable to an MBO market data feed.

The disclosed embodiments relate to predicting trade activity times and/or providing same to market participants. In one embodiment, the disclosed system may include a Market Segment Gateway ("MSG") that is the point of ingress/entry and/or egress/departure for all transactions, i.e., the network traffic/packets containing the data therefore, specific to a single market at which the order of receipt of those transactions may be ascribed. An MSG or Market Segment Gateway may be utilized for the purpose of deterministic operation of the market. The electronic trading system may include multiple MSGs, one for each market/product implemented thereby. For more detail on deterministic operation in a trading system, see U.S. patent application Ser. No. 14/074,667 entitled "TRANSACTIONALLY DETERMINISTIC HIGH SPEED FINANCIAL EXCHANGE HAVING IMPROVED, EFFICIENCY, COMMUNICATION, CUSTOMIZATION, PERFORMANCE, ACCESS, TRADING OPPORTUNITIES, CREDIT CONTROLS, AND FAULT TOLERANCE" and filed on Nov. 7, 2013, herein incorporated by reference.

For example, a participant may send a request for a new transaction, e.g., a request for a new order, to the MSG. The MSG extracts or decodes the request message and determines the characteristics of the request message.

The MSG may include, or otherwise be coupled with, a buffer, cache, memory, database, content addressable memory, data store or other data storage mechanism, or combinations thereof, which stores data indicative of the characteristics of the request message. The request is passed to the transaction processing system, e.g., the match engine.

In one embodiment, if a participant wishes to modify a previously sent request, e.g., a prior order which has not yet been processed or traded, they may send a request message comprising a request to modify the prior request.

In particular, in one embodiment, upon receipt of a request, a token is allocated and included in a TCP shallow acknowledgment transmission sent back to the participant acknowledging receipt of the request. It should be appreciated that while this shallow acknowledgment is, in some sense, a response to the request, it does not confirm the processing of an order included in the request. The participant, i.e., their device, then sends back a TCP acknowledgment which acknowledges receipt of the shallow acknowledgment and token.

In one exemplary embodiment, the incoming request itself, e.g., the inbound order entry, may be referred to as an iLink message. iLink is a bidirectional communications/message protocol/message format implemented by the Chicago Mercantile Exchange Inc.

As should be appreciated, the disclosed embodiments described herein facilitate predicting and providing useful information about the current state of the market to market participants. A market participant can thus make a better decision about his or her trading strategies based upon the time required to currently process trades. Without this information, a trader must be willing to risk that the market does not substantially or materially change in the unknown amount of time needed to process a trade. Or, a trader may send multiple low-risk messages to test response time, thereby reducing processing capacity of the match engine.

The disclosed embodiments may eliminate the necessity for low-risk messages, thereby reducing the amount of data consumed over the communications medium. This then increases the amount of bandwidth available for other communications or allows for the use of a lesser bandwidth, and potentially lesser cost, communications medium. It will also be appreciated that a reduction in the number of messages that need to be generated further reduces the processing resources necessary for generating such messages.

In accordance with aspects of the disclosure, systems and methods are disclosed for predicting and providing the current state of an electronic market. It should be appreciated that the plurality of entities utilizing the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1. An exchange computer system 100 receives messages that include orders and transmits market data related to orders and trades to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop or other computers, such as the example computer 200 described below with respect to FIG. 2. A user database 102 may be provided which includes information identifying traders and other users of exchange computer system 100, such as account numbers or identifiers, user names and passwords. An account data module 104 may be provided which may process account information that may be used during trades. A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by the order book module 110 and/or match engine module 106. A message management module 140 may be included to, among other things, receive, and extract orders from, electronic messages as is indicated with one or more aspects of the disclosed embodiments. A market condition prediction module 142 may be included to generate transaction processing system latency estimates, as discussed herein. It should be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, the message management module 140, the market condition prediction module 142, or other component of the exchange computer system 100.

In an embodiment, the message management module 140, as coupled with the order book module 110, may be configured for receiving a plurality of electronic messages, each of the plurality of messages having an associated action to be executed within a designated period of time having a beginning time and an ending time, wherein at least one electronic message of the plurality of electronic messages comprises data representative of a particular time between the beginning and end of the period of time at which the action associated with the at least one electronic message is to be executed. The exchange computer system 100 may then be further configured to execute the action associated with the at least one temporally specific message at the particular time.

The message management module 140 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure.

One skilled in the art will appreciate that one or more modules described herein may be implemented using, among other things, a tangible computer-readable medium comprising computer-executable instructions (e.g., executable software code). Alternatively, modules may be implemented as software code, firmware code, hardware, and/or a combination of the aforementioned. For example the modules may be embodied as part of an exchange 100 for financial instruments.

The trading network environment shown in FIG. 1 includes exemplary computer devices 114, 116, 118, 120 and 122 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail below with respect to FIG. 2, may include a central processor that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 220 shown in FIG. 2 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g., star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based compute device, or other wireless device, may communicate with the LAN 124 and/or the Internet 126 via radio waves, such as via WiFi, Bluetooth and/or a cellular telephone based data communications protocol. PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 220 shown in FIG. 2 and described below with respect thereto.

As was described above, the users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other match or trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 116 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 118 may include computer-executable instructions for receiving market data from exchange computer system 100 and displaying that information to a user. In another example, the exemplary computer device 118 may include a non-transitory computer-readable medium that stores instructions for predicting and/or publishing a current response time or current match engine latency as described herein.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

As shown in FIG. 1, the exchange computer system 100 further includes a message management module 140 which may implement, in conjunction with the market data module 112, the disclosed mechanisms for managing electronic messages containing financial data sent between an exchange and a plurality of market participants, or vice versa. However, as was discussed above, the disclosed mechanisms may be implemented at any logical and/or physical point(s) through which the relevant message traffic, and responses thereto, flows or is otherwise accessible, including one or more gateway devices, modems, the computers or terminals of one or more traders, etc.

Figure 2:
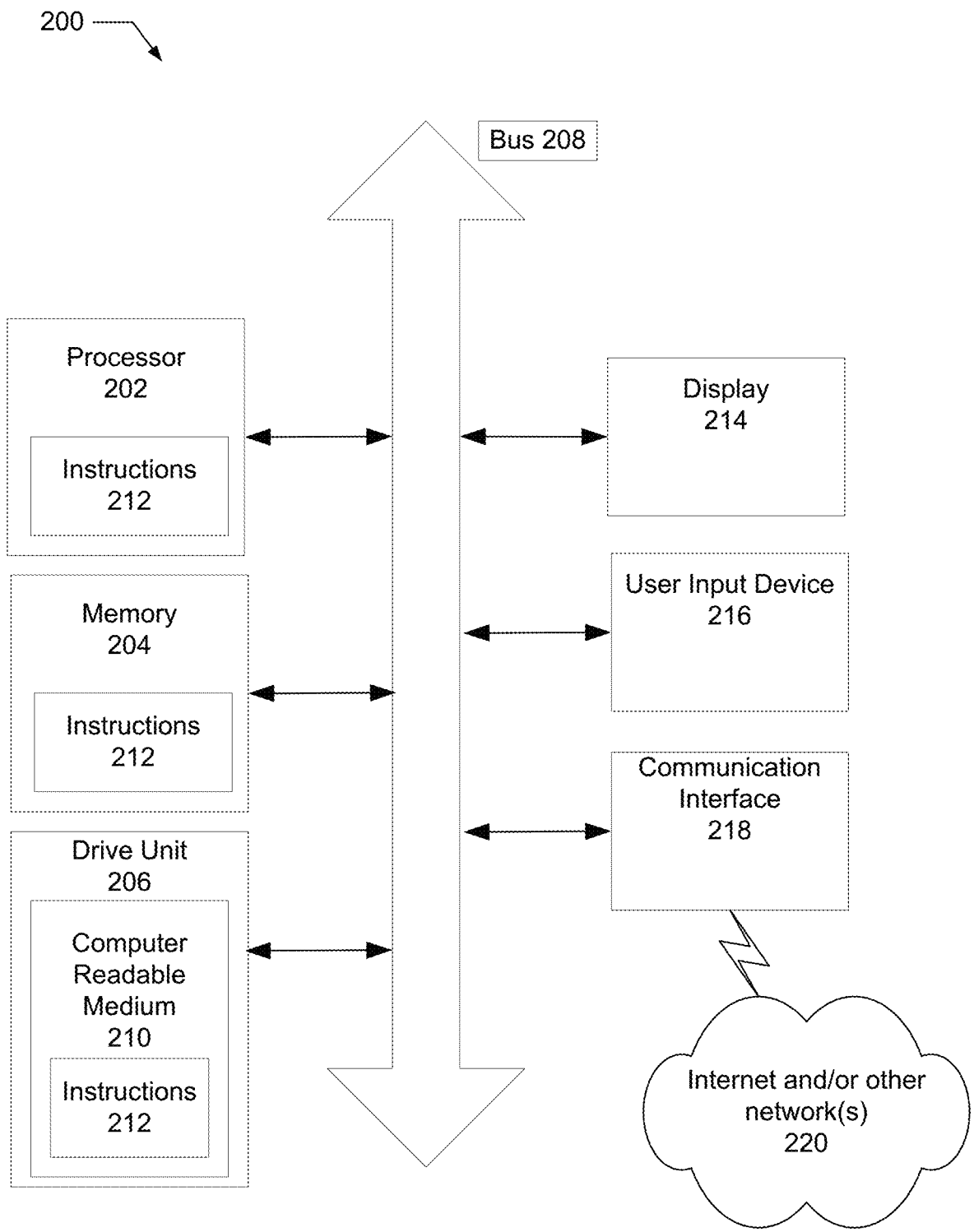
FIG. 2 depicts an illustrative embodiment of a general computer system for use with the disclosed embodiments.

Referring to FIG. 2, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed above, such as the processor 202, may be a computer system 200 or a component in the computer system 200. The computer system 200 may implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firmware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed above.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly as discussed below. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Figure 3:
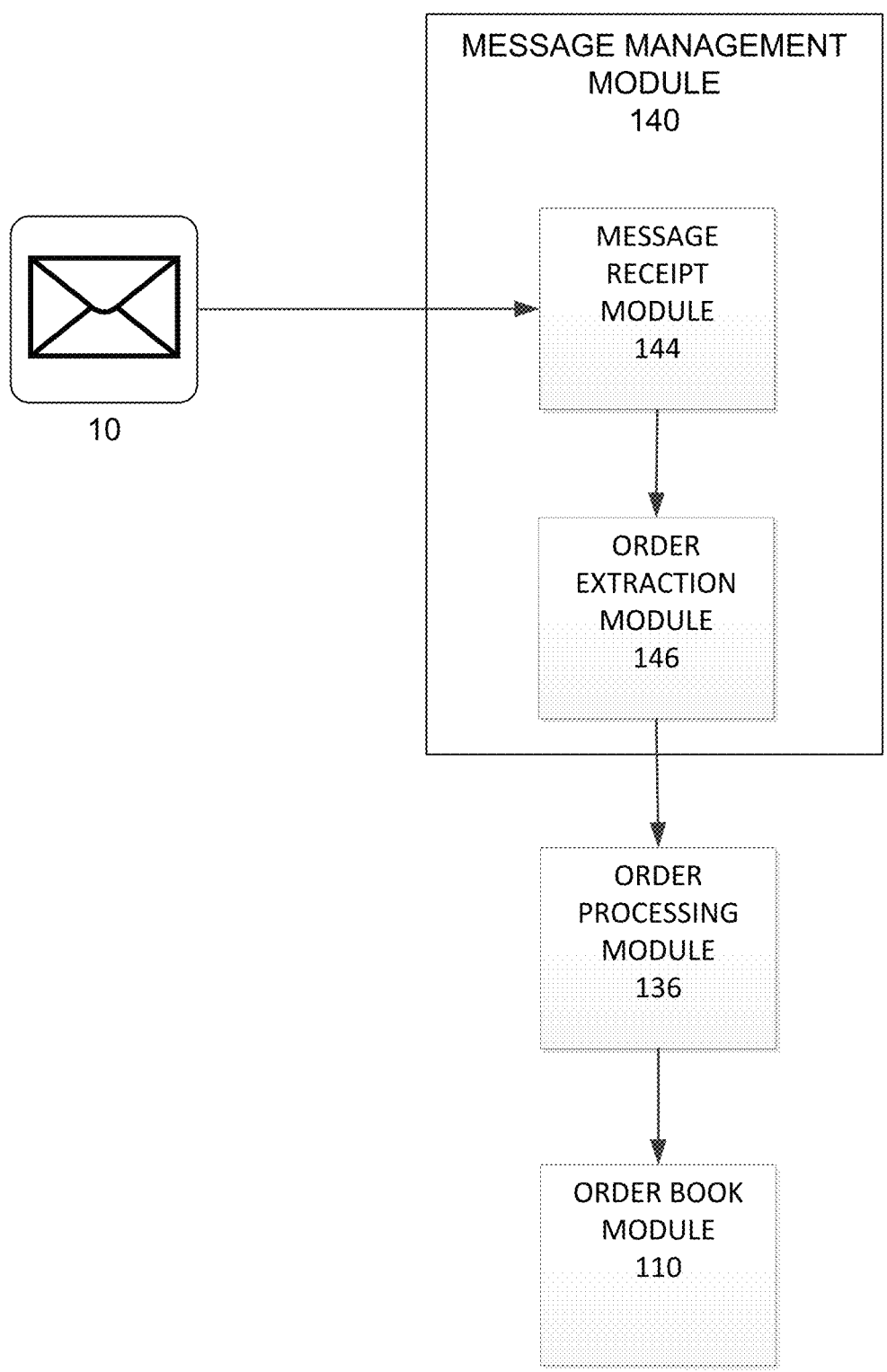
FIG. 3 depicts an example market order message management system for implementing the disclosed embodiments.

FIG. 3 illustrates an embodiment of market order message management as implemented using the message management module 140 and order book module 110 of the exchange computer system 100. As such, a message 10 may be received from a market participant at the exchange computer system 100 by a message receipt module 144 of the message management module 140. The message receipt module 144 processes the message 10 by interpreting the content of the message based on the message transmit protocol, such as the transmission control protocol ("TCP"), to provide the content of the message 10 for further processing by the exchange computer system.

Further processing may be performed by the order extraction module 146. The order extraction module 146 may be configured to detect, from the content of the message 10 provided by the message receipt module 144, characteristics of an order for a transaction to be undertaken in an electronic marketplace. For example, the order extraction module 146 may identify and extract order content such as a price, product, volume, and associated market participant for an order. The order extraction module 146 may also identify and extract data indicating an action to be executed by the exchange computer system 100 with respect to the extracted order. The order extraction module may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the MSG or Market Segment Gateway), message type (e.g., new, modify, cancel), and the number of matches generated by a message. Order or message characteristics may also include market participant side (e.g., buy or sell) or time in force (e.g., a good until end of day order that is good for the full trading day, a good until canceled ordered that rests on the order book until matched, or a fill or kill order that is canceled if not filled immediately).

The order may be communicated from the order extraction module 146 to an order processing module 136. The order processing module 136 may be configured to interpret the communicated order, and manage the order characteristics, other information, and associated actions as they are processed through an order book module 110 and eventually transacted on an electronic market. For example, the order processing module 136 may store the order characteristics and other content and execute the associated actions. In an embodiment, the order processing module may execute an associated action of placing the order into an order book for an electronic trading system managed by the order book module 110. In an embodiment, placing an order into an order book and/or into an electronic trading system may be considered a primary action for an order. The order processing module 136 may be configured in various arrangements, and may be configured as part of the order book module 110, part of the message management module 140, or as an independent functioning module.

The embodiments described herein utilize trade related electronic messages such as mass quote messages, individual order messages, modification messages, cancelation messages, etc., so as to enact trading activity in an electronic market. The trading entity and/or market participant may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange 100 includes a place or system that receives and/or executes orders.

It should be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entirety. Further, the disclosed message management system may be implemented using an open message standard implementation, such as FIX or FIX/FAST, or by an exchange-provided API.

In an embodiment, a plurality of electronic messages is received from the network. The plurality of electronic message packets may be received at a network interface for the electronic trading system. The plurality of electronic messages may be sent from market participants. The plurality of messages may include order characteristics and be associated with actions to be executed with respect to an order that may be extracted from the order characteristics. The action may involve any action as associated with transacting the order in an electronic trading system. The actions may involve placing the orders within a particular market and/or order book of a market in the electronic trading system.

In an embodiment, the market may operate using characteristics that involve collecting orders over a period of time, such as a batch auction market. In such an embodiment, the period of time may be considered an order accumulation period. The period of time may involve a beginning time and an ending time, with orders placed in the market after the beginning time, and the placed order matched at or after the ending time. As such, the action associated with an order extracted from a message may involve placing the order in the market within the period of time. Also, electronic messages may be received prior to or after the beginning time of the period of time.

The electronic messages may also include other data relating to the order. In an embodiment, the other data may be data indicating a particular time in which the action is to be executed. As such, the order may be considered a temporally specific order. The particular time in which an action is undertaken may be established with respect to any measure of absolute or relative time. In an embodiment, the time in which an action is undertaken may be established with reference to the beginning time of the time period or ending time of the time period in a batch auction embodiment. For example, the particular time may be a specific amount of time, such as 10 milliseconds, prior to the ending time of an order accumulation period in the batch auction. Further, the order accumulation period may involve dissecting the accumulation period into multiple consecutive, overlapping, or otherwise divided, sub-periods of time. For example, the sub-periods may involve distinct temporal windows within the order accumulation period. As such, the particular time may be an indicator of a particular temporal window during the accumulation period. For example, the particular time may be specified as the last temporal window prior to the ending time of the accumulation period.

In an embodiment, the electronic message may also include other actions to be taken with respect to the order. These other actions may be actions to be executed after the initial or primary action associated with the order. For example, the actions may involve modifying or canceling an already placed order. Further, in an embodiment, the other data may indicate order modification characteristics. For example, the other data may include a price or volume change in an order. The other actions may involve modifying the already placed order to align with the order modification characteristics, such as changing the price or volume of the already placed order.

In an embodiment, other actions may be dependent actions. For example, the execution of the actions may involve a detection of an occurrence of an event. Such triggering events may be described as other data in the electronic message. For example, the triggering event may be a release of an economic statistic from an organization relating to a product being bought or sold in the electronic market, a receipt of pricing information from a correlated electronic market, a detection of a change in market sentiment derived from identification of keywords in social media or public statements of official related to a product being bought or sold in the electronic market, and/or any other event or combination of events which may be detected by an electronic trading system.

In an embodiment, the action, or a primary action, associated with an order may be executed. For example, an order extracted from electronic message order characteristics may be placed into a market, or an electronic order book for a market, such that the order may be matched with other order counter thereto.

In an embodiment involving a market operating using batch auction principles, the action, such as placing the order, may be executed subsequent to the beginning time of the order accumulation period, but prior to the ending time of the order accumulation period. Further, as indicated above, a message may also include other information for the order, such as a particular time the action is to be executed.

In such an embodiment, the action may be executed at the particular time. For example, in an embodiment involving a batch auction process having sub-periods during an order accumulation period, an order may be placed during a specified sub-period of the order accumulation period. The disclosed embodiments may be applicable to batch auction processing, as well as continuous processing.

Also, it may be noted that messages may be received prior or subsequent to the beginning time of an order accumulation period. Orders extracted from messages received prior to the beginning time may have the associated actions, or primary actions such as placing the order, executed at any time subsequent to the beginning time, but prior to the ending time, of the order accumulation period when no particular time for the execution is indicated in the electronic message. In an embodiment, messages received prior to the beginning time but not having a particular time specified will have the associated action executed as soon as possible after the beginning time. Because of this, specifying a time for order action execution may allow a distribution and more definite relative time of order placement so as to allow resources of the electronic trading system to operate more efficiently.

In an embodiment, the execution of temporally specific messages may be controlled by the electronic trading system such that a limited or maximum number may be executed in any particular accumulation period, or sub-period. In an embodiment, the order accumulation time period involves a plurality of sub-periods involving distinct temporal windows, a particular time indicated by a message may be indicative of a particular temporal window of the plurality of temporal windows, and the execution of the at least one temporally specific message is limited to the execution of a specified sub-period maximum number of temporally specific messages during a particular sub-period. The electronic trading system may distribute the ability to submit temporally specific message to selected market participants. For example, only five temporally specific messages may be allowed in any one particular period or sub-period. Further, the ability to submit temporally specific messages within particular periods or sub-periods may be distributed based on any technique. For example, the temporally specific messages for a particular sub-period may be auctioned off or otherwise sold by the electronic trading system to market participants. Also, the electronic trading system may distribute the temporally specific messages to preferred market participants, or as an incentive to participate in a particular market.

In an embodiment, an event occurrence may be detected. The event occurrence may be the occurrence of an event that was specified as other information relating to an order extracted from an electronic message. The event may be a triggering event for a modification or cancelation action associated with an order. The event may be detected subsequent to the execution of the first action when an electronic message further comprises the data representative of the event and a secondary action associated with the order. In an embodiment involving a market operating on batch auction principles, the event may be detected subsequent to the execution of a first action, placing an order, but prior to the ending time of an order accumulation period in which the action was executed.

In an embodiment, other actions associated with an order may be executed. The other actions may be any action associated with an order. For example, the action may be a conditional action that is executed in response to a detection of an occurrence of an event. Further, in a market operating using batch auction principles, the conditional action may be executed after the placement of an order during an order accumulation period, but in response to a detection of an occurrence of an event prior to an ending time of the order accumulation period. In such an embodiment, the conditional action may be executed prior to the ending time of the order accumulation period. For example, the placed order may be canceled, or modified using other provided order characteristics in the message, in response to the detection of the occurrence of the event.

An event may be a release of an economic statistic or a fluctuation of prices in a correlated market. An event may also be a perceptible change in market sentiment of a correlated market. A change may be perceptible based on a monitoring of orders or social media for keywords in reference to the market in question. For example, electronic trading systems may be configured to be triggered for action by a use of keywords during a course of ongoing public statements of officials who may be in a position to impact markets, such as Congressional testimony of the Chairperson of the Federal Reserve System.

The other, secondary, or supplemental action may also be considered a modification of a first action executed with respect to an order. For example, a cancelation may be considered a cancelation of the placement of the order. Further, a secondary action may have other data in the message which indicates a specific time in which the secondary action may be executed. The specific time may be a time relative to a first action, or placement of the order, or relative to an accumulation period in a batch auction market. For example, the specific time for execution of the secondary action may be at a time specified relative and prior to the ending period of the order accumulation period. Further, multiple secondary actions may be provided for a single order. Also, with each secondary action a different triggering event may be provided.

In an embodiment, an incoming transaction may be received. The incoming transaction may be from, and therefore associated with, a market participant of an electronic market managed by an electronic trading system. The transaction may involve an order as extracted from a received message, and may have an associated action. The actions may involve placing an order to buy or sell a financial product in the electronic market, or modifying or deleting such an order. In an embodiment, the financial product may be based on an associated financial instrument which the electronic market is established to trade.

In an embodiment, the action associated with the transaction is determined. For example, it may be determined whether the incoming transaction comprises an order to buy or sell a quantity of the associated financial instrument or an order to modify or cancel an existing order in the electronic market. Orders to buy or sell and orders to modify or cancel may be acted upon differently by the electronic market. For example, data indicative of different characteristics of the types of orders may be stored.

In an embodiment, data relating to the received transaction is stored. The data may be stored in any device, or using any technique, operable to store and provide recovery of data. For example, a memory 204 or computer readable medium 210, may be used to store data, as is described above with respect to FIG. 2. Data may be stored relating received transactions for a period of time, indefinitely, or for a rolling most recent time period such that the stored data is indicative of the market participant's recent activity in the electronic market.

If and/or when a transaction is determined to be an order to modify or cancel a previously placed, or existing, order, data indicative of these actions may be stored. For example, data indicative of a running count of a number or frequency of the receipt of modify or cancel orders from the market participant may be stored. A number may be a total number of modify or cancel orders received from the market participant, or a number of modify or cancel orders received from the market participant over a specified time. A frequency may be a time based frequency, as in a number of cancel or modify orders per unit of time, or a number of cancel or modify orders received from the market participant as a percentage of total transactions received from the participant, which may or may not be limited by a specified length of time.

If and/or when a transaction is determined to be an order to buy or sell a financial product, or financial instrument, other indicative data may be stored. For example, data indicative of quantity and associated price of the order to buy or sell may be stored.

Further, when a transaction is determined to be an order to buy or sell a financial product, or financial instrument, a quality of activity as related to the market participant associated with the order may be calculated. The quality may be calculated as a specific value indicative of such quality, or a quality value. A value indicative of a quality of market activity may be considered a value that indicates whether the market activity of the market participant is conducive to improving market liquidity. As such, a quality value may be indicative of previously received transactions from the market participant having increased a probability that the processor will successfully match a subsequently received incoming order to buy or sell the associated financial instrument with at least one other received but unsatisfied order for a transaction counter thereto for the associated financial instrument, to at least partially satisfy one or both of the incoming order or the at least one other received order. Further, the value may be calculated based on the price of the incoming order, previously stored quantities, previously stored data indicative of previously received orders to modify or cancel, and previously stored data indicative of a result of attempts to match previously received orders stored in association with the market participant.

A quality value may be considered a market quality index ("MQI"), indicative of the market participant's quality of market activity. As such, particular categories of market activity may be quantified as a particular score for respective particular categories. Further, the scores of each, or selected, particular categories of market activity may be summed or added together to calculate the quality value or MQI. In an embodiment, the scores for the particular categories may be determined as percentile scores for a market participant in the particular category, as compared with other or all market participants in the electronic market. Further, particular category scores may be determined using data limited to transactions received over a particular length of time, or a most recent number of received transactions. Also, the particular length of time may be a most recent length of time, and as such a rolling window of time indicative of recent market activity of the market participant.

One of the particular categories may be a price proximity category. A proximity category may involve a proximity score indicating a proximity of the received order price to a midpoint of a current price spread of currently unmatched orders. A price spread may be any type of price spread or range or available prices for the product of the electronic market. For example, a price spread may be a difference between a highest price associated with a buy order and a lowest price associated with a sell order. Further, a proximity may be determined using any technique. In an embodiment, a raw difference between the received order price and an average price of the price spread (i.e., bid-ask spread) may be used. For example, a bid-ask spread may be $93.00-$94.00 in a market. As such, the midpoint may be $93.50. An order to buy may then be placed into the market at $92.00, having a corresponding proximity to the midpoint of 1.5. Similarly, an order to buy may be placed in the market at $94.00, which provides a 0.5 proximity to midpoint. Further, the proximity to midpoint may include designations of over/under midpoint values. For example, prices for orders to buy may have a proximity to midpoint defined as the bid-ask spread minus the price, providing values of 1.5 and −0.5 respectively for the examples above. Similarly, offers to sell may have a proximity to midpoint determined as the offer price minus the midpoint, thus providing inverted designations from the offers to buy. In one embodiment, a lower absolute value of price proximity may be more desirable for market quality than larger proximity scores. Other statistical proximity indicators, such as a standard deviation, or variance, as compared with other open or unmatched orders in the electronic market may also be used.

Another particular category may be an order size category. Larger quantities may be more desirable for liquidity generation than smaller quantities, and as such a market may encourage larger orders by quantifying historical order sizes of market participants in the order size category. The size category may involve a size score indicative of an average quantity of previously received orders from the market participant determined using the previously stored quantities. The average may be determined using any technique, such as a statistical mean or arithmetic average.

Another particular category may be a matched order volume category. A market may consider a number of previously matched orders by a market participant an indicator of a willingness or propensity to trade. As such, the matched order volume may involve a volume score indicative of a number of matched previously received orders from the market participant determined using previously stored data indicative of a result of attempts to match previously received orders stored in association with the market participant.

Yet another particular category may be an order modification category. Market activity characterized by rapid entry and subsequent cancelation or modification of orders that may move an offer to buy to a lower price, or an offer to sell to a higher price, may be considered not conducive to market liquidity. As such, an order modification category may involve a modification score indicative of a frequency of order modifications or cancelations of the market participant determined using the previously stored data indicative of previously received orders to modify or cancel from the market participant. It may be noted that as orders may be modified multiple times, a measure of the number of modifications on a percentage of total orders by a market participant may be above 100%, or generally a larger number than the maximum total number of orders provided to the market by the market participant.

In an embodiment, the particular categories may be weighted by designated weighting factors prior to the summing. In such an embodiment, the calculation of the quality value, or MQI, may be characterized by Equation 1.

$$V = (W_P \times S_P) + (W_S \times S_S) + (W_V \times S_V) + (W_M \times S_M) \quad \text{Equation 1:}$$

In Equation 1, V is the value, $S_P$ is the proximity score, $W_P$ is the weighting factor for the proximity score, $S_S$ is the size score, $W_S$ is the weighting factor for the size score, $S_V$ is the volume score, $W_V$ is the weighting factor for the volume score, $S_M$ is the modification score, $W_M$ is the weighting factor for the modification score. The weighting factors may be provided by any weighting technique. For example, each of the weighting factors may be an allocated value, wherein all the weighting factors added together equal 100% of a total value. In an embodiment, each of the scored values may receive equal weighting, such as 25%. For example, if an order with an associated market participant receives a proximity score of 50, a size score of 70, a volume score of 60 and a modification score of 35, a corresponding calculated MQI may be 53.75 when the weighting factors are equalized at 0.25. Note, that in such an embodiment, total MQI scores will vary between 0 and 100. As such, with lower category scores indicating better market activity characteristics, 0 may represent the minimum possible, or best possible, score, whereas 100 may represent the maximum, or worst possible, score.

In an embodiment, each score may be determined as a percentile comparative to other market participants. For example, if there are 100 market participants and a particular market participant has a proximity score that ranks that market participant as having the $40^{th}$ best proximity score raw value, such a participant may be considered in the $60^{th}$ percentile, and receive a 60 value as a proximity score. In an alternative embodiment, the same market participant may receive a 40 value as a proximity score. As understood by those with experience in the art, a selection of whether a lower number or a higher number score is favorable may be determinative of how percentile scores are awarded or otherwise calculated.

An electronic market may then attempt to match the incoming order to buy or sell with an appropriate counter order to buy or sell. As such, the electronic market may generate and/or execute trades of financial products between market participants. Further, the attempts to match may be enhanced by providing that some orders to buy or sell in the electronic market are given priority in matching over other orders in the electronic market. As such, an identical order to buy or sell, i.e., an identical volume at an identical price, may be differentiated based on assigned priorities such that the order of the identical orders having a higher priority is matched prior to the order having a lower priority. Priorities may be determined using various techniques. In an embodiment, orders may be assigned priority deterministically, that is orders may be assigned priority based on when an order was placed in an electronic market, such that orders placed earlier may have higher priorities. Another technique for determining a priority for an order may be based on the quality value or MQI of an order. For example, orders having a better MQI, i.e., a smaller value, may be filled or otherwise selected for matching over and/or prior to orders having a worse MQI, i.e., a larger value.

In an embodiment involving a market operating using batch auction principles, orders to buy or sell a product of a market may be accumulated over a period of time, such as one minute. At the end of the accumulation period, attempts to match the accumulated orders are made. A matching process for a batch order market may involve filing accumulated orders at a singular price. For example, accumulated counter orders may be overlaid using a supply curve based on the prices and quantities of accumulated orders. As such, matches may be made using an intersect of the two, i.e., buy and sell, supply and demand curves as a singular price, or also known as an equilibrium price, for matching counter orders. Contrarily, when there is no price intersect of the supply and demand curves, no trades may be executed. Generally, when a price intersect is determined, more orders meet the matching price criteria on one curve than the other curve, and thus some number of matchable orders may not have corresponding counter orders, and consequentially may not be matched. Priority of orders may be used to determine which matchable orders are actually matched at the end of the order accumulation period in the electronic market. For example, orders having a better MQI score or value may be selected for matching over orders having a worse MQI score.

An MQI score may be used for purposes aside from matching trades. For example, an MQI score may be determined using characteristics specific to a particular market participant, such as an MQI involving just size, volume, and modification scores as indicated above. Such other uses may include any other use for a value indicative of a market participant's propensity for improving market liquidity.

In an embodiment, an MQI value may be used to establish a fee structure for the participation in a market of market participants. Exchanges may establish a fee structure that preferences certain market participants. As such, a fee structure may be established based on MQI values for market participants, so that better MQI values correlate to lower fees for the associated market participant.

In an embodiment, an MQI may be used to determine a focus for marketing or sales activities of a market exchange administrator. Marketing and/or sales activities are frequently focused on market participants of greater perceived importance. Reference to an MQI of a market participant may be used to determine such marketing or sales activity focus.

Data indicative of attempts to match incoming order may also be saved. The data may be stored in any device, or using any technique, operable to store and provide recovery of data. For example, a memory 204 or computer readable medium 210, may be used to store data, as is described above with respect to FIG. 2.

The acts of the process as described herein may also be repeated. As such, data for multiple received transactions for multiple market participants may be stored and used as describe herein.

The order processing module 136 may also store data indicative of characteristics of the extracted orders. For example, the order processing module may store data indicative of orders having an associated modify or cancel action, such as by recording a count of the number of such orders associated with particular market participants. The order processing module may also store data indicative of quantities and associated prices of orders to buy or sell a product placed in the market order book 710, as associated with particular market participants.

Also, the order processing module 136 may be configured to calculate and associate with particular orders a value indicative of an associated market participant's market activity quality, which is a value indicative of whether the market participant's market activity increases or tends to increase liquidity of a market. This value may be determined based on the price of the particular order, previously stored quantities of orders from the associated market participant, the previously stored data indicative of previously received orders to modify or cancel as associated with the market participant, and previously stored data indicative of a result of the attempt to match previously received orders stored in association with the market participant. The order processing module 136 may determine or otherwise calculate scores indicative of the quality value based on these stored extracted order characteristics, such as an MQI as described herein.

Further, electronic trading systems may perform actions on orders placed from received messages based on various characteristics of the messages and/or market participants associated with the messages. These actions may include matching the orders either during a continuous auction process, or at the conclusion of a collection period during a batch auction process. The matching of orders may be by any technique.

The matching of orders may occur based on a priority indicated by the characteristics of orders and market participants associated with the orders. Orders having a higher priority may be matched before orders of a lower priority. This priority may be determined using various techniques. For example, orders that were indicated by messages received earlier may receive a higher priority to match than orders that were indicated by messages received later. Also, scoring or grading of the characteristics may provide for priority determination. Data indicative of order matches may be stored by a match engine and/or an order processing module 136, and used for determining MQI scores of market participants.

Generally, a market may involve market makers, such as market participants who consistently provide bids and/or offers at specific prices in a manner typically conducive to balancing risk, and market takers who may be willing to execute transactions at prevailing bids or offers may be characterized by more aggressive actions so as to maintain risk and/or exposure as a speculative investment strategy. From an alternate perspective, a market maker may be considered a market participant who places an order to sell at a price at which there is no previously or concurrently provided counter order. Similarly, a market taker may be considered a market participant who places an order to buy at a price at which there is a previously or concurrently provided counter order. A balanced and efficient market may involve both market makers and market takers, coexisting in a mutually beneficial basis. The mutual existence, when functioning properly, may facilitate liquidity in the market such that a market may exist with "tight" bid-ask spreads (e.g., small difference between bid and ask prices) and a "deep" volume from many currently provided orders such that large quantity orders may be executed without driving prices significantly higher or lower.

As such, both market participant types are useful in generating liquidity in a market, but specific characteristics of market activity taken by market participants may provide an indication of a particular market participant's effect on market liquidity. For example, a Market Quality Index ("MQI") of an order may be determined using the characteristics. An MQI may be considered a value indicating a likelihood that a particular order will improve or facilitate liquidity in a market. That is, the value may indicate a likelihood that the order will increase a probability that subsequent requests and transaction from other market participants will be satisfied. As such, an MQI may be determined based on a proximity of the entered price of an order to a midpoint of a current bid-ask price spread, a size of the entered order, a volume or quantity of previously filled orders of the market participant associated with the order, and/or a frequency of modifications to previous orders of the market participant associated with the order. In this way, an electronic trading system may function to assess and/or assign an MQI to received electronic messages to establish messages that have a higher value to the system, and thus the system may use computing resources more efficiently by expending resources to match orders of the higher value messages prior to expending resources of lower value messages.

While an MQI may be applied to any or all market participants, such an index may also be applied only to a subset thereof, such as large market participants, or market participants whose market activity as measured in terms of average daily message traffic over a limited historical time period exceeds a specified number. For example, a market participant generating more than 500, 1,000, or even 10,000 market messages per day may be considered a large market participant.

Figure 4A:
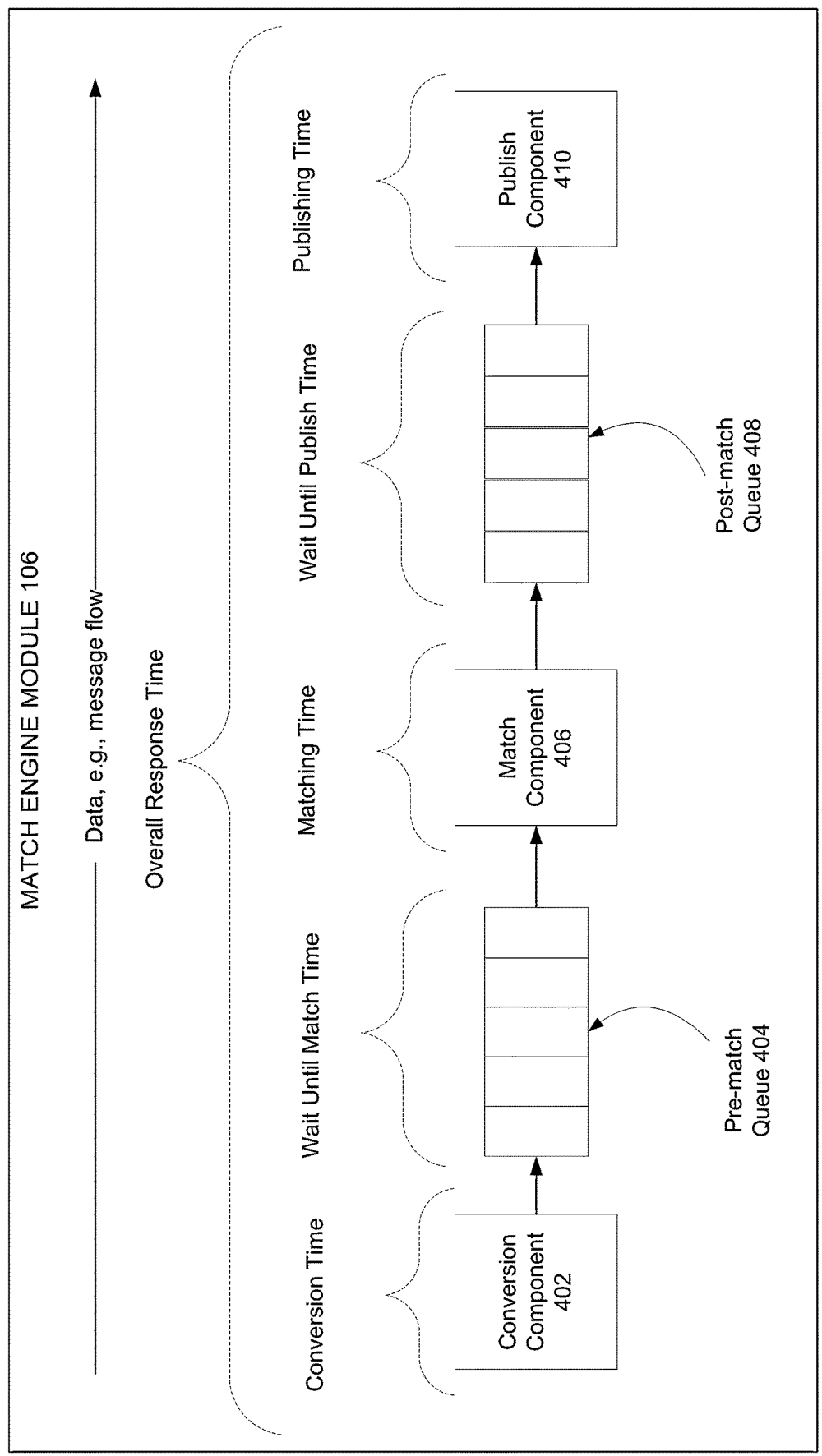
FIG. 4A depicts an example match engine module for implementing the disclosed embodiments.

FIG. 4A illustrates an example embodiment of a match engine module 106. Match engine module 106 includes a conversion component 402, pre-match queue 404, match component 406, post-match queue 408 and publish component 410. The match engine module 106 may be an example of a transaction processing system. The pre-match queue 404 may be an example of a pre-transaction queue. The match component 406 may be an example of a transaction component. The post-match queue 408 may be an example of a post-transaction queue. The publish component 410 may be an example of a distribution component. The transaction component may process messages and generate transaction component results.

In one embodiment, the publish component may be a distribution component that can distribute data to one or more market participant computers. In one embodiment, match engine module 106 operates according to a first in, first out (FIFO) ordering. The conversion component 402 converts or extracts a message received from a trader via the Market Segment Gateway or MSG into a message format that can be input into the pre-match queue 404.

Messages from the pre-match queue enter the match component 406 sequentially and are processed sequentially. In one regard, the pre-transaction queue, e.g., the pre-match queue, may be considered to be a buffer or waiting spot for messages before they can enter and be processed by the transaction component, e.g., the match component. The match component matches orders, and the time a messages spends being processed by the match component can vary, depending on the contents of the message and resting orders on the book. Thus, newly received messages wait in the pre-transaction queue until the match component is ready to process those messages. Moreover, messages are received and processed sequentially or in a first-in, first-out FIFO methodology. The first message that enters the pre-match or pre-transaction queue will be the first message to exit the pre-match queue and enter the match component. In one embodiment, there is no out-of-order message processing for messages received by the transaction processing system. The pre-match and post-match queues are, in one embodiment, fixed in size, and any messages received when the queues are full may need to wait outside the transaction processing system or be re-sent to the transaction processing system.

The match component 406 processes an order or message, and may generate one message or more than one message, depending on whether an incoming order was successfully matched by the match component. An order message that matches against a resting order in the order book may generate dozens or hundreds of messages. For example, a large incoming order may match against several smaller resting orders at the same price level. For example, if many orders match due to a new order message, the match engine needs to send out multiple messages informing traders which resting orders have matched. Or, an order message may not match any resting order and only generate an acknowledgement message. Thus, the match component 406 in one embodiment will generate at least one message, but may generate more messages, depending upon the activities occurring in the match component. For example, the more orders that hit or are matched due to a given message being processed by the match component, the more time may be needed to process that message. Other messages behind that given message will have to wait in the pre-match queue.

Messages resulting from matches in the match component 406 enter the post-match queue 408. The post-match queue may be similar in functionality and structure to the pre-match queue discussed above, e.g., the post-match queue is a FIFO queue of fixed size. As illustrated in FIG. 4A, a primary difference between the pre- and post-match queues is the location and contents of the structures, namely, the pre-match queue stores messages that are waiting to be processed, whereas the post-match queue stores match component results due to matching by the match component. The match component receives messages from the pre-match queue, and sends match component results to the post-match queue.

Messages from the post-match queue 408 enter the publish component 410 sequentially and are published via the MSG sequentially. Thus, the messages in the post-match queue 408 are an effect or result of the messages that were previously in the pre-match queue 404. In other words, messages that are in the pre-match queue 404 at any given time will have an impact on or affect the contents of the post-match queue 408, depending on the events that occur in the match component 406 once the messages in the pre-match queue 404 enter the match component 406.

It should be appreciated that the amount of time needed for the exchange system to respond to an order submission or message can vary depending on the messaging load or the number of orders being processed or matched at any given time. In other words, the transaction processing system cannot respond to messages quickly if it is still processing or matching other messages. Market activity can be volatile and drastically change in a very short amount of time, e.g., a few microseconds or even nanoseconds. If more time is needed to process an order, the risk for the market participant increases. In other words, if the match engine load is high, there may be a risk that a market participant may not be able to secure a price level that was observed to be available. For example, the price level or market of a financial instrument might change between the time an order is submitted by a market participant and the time that order message enters the match component.

Moreover, orders in the match engine module are processed sequentially based on the time they were received. Order acknowledgements and other resulting messages are published sequentially in the order they are received by the publish component. Thus, the time that a customer receives an acknowledgment that an order entered the match component depends upon the activity in the match component, as well as how many messages currently exist in the pre-match and/or post-match queue. During times of heavy volume and processing, a market participant may experience a long response time just to receive an acknowledgement that his or her message entered the match component, because the acknowledgement may be behind several other messages in the transaction processing system. Thus, a market participant may face risks and uncertainty due to extended response times, for acknowledgments as well or match confirmations or fills.

As noted above, the match engine module in one embodiment operates in a first in first out (FIFO) scheme. In other words, the first message that enters the match engine module 106 is the first message that is processed by the match engine module 106. Thus, the match engine module 106 in one embodiment processes messages in the order the messages are received. In FIG. 4A, as shown by the data flow arrow, data is processed sequentially by the illustrated structures from left to right, beginning at the conversion component 402, to the pre-match queue, to the match component 406, to the post-match queue 408, and to the publish component 410. The overall transaction processing system operates in a FIFO scheme such that data flows from element 402 to 404 to 406 to 408 to 410, in that order. If any one of the queues or components of the transaction processing system experiences a delay, that creates a backlog for the structures preceding the delayed structure. For example, if the match or transaction component is undergoing a high processing volume, and if the pre-match or pre-transaction queue is full of messages waiting to enter the match or transaction component, the conversion component may not be able to add any more messages to the pre-match or pre-transaction queue.

As discussed above, market participants' strategies may heavily depend on the current response time of the match engine. In particular, market participants' strategies may depend on the occurrence or timing of certain events in the match engine. For example, a market participant may want to know that his or her order has entered the match component 406. Or, a market participant may want to know whether his or her order has matched some other order that is resting on the books. Thus, it should be appreciated that market participants desire to be informed about certain match engine events as quickly as possible. A market data feed, discussed herein, is a mechanism for disseminating information to market participants.

The exchange system may be configured to calculate, estimate or predict a current response time for a match engine. The estimate may be provided to market participants so that participants may be able to better understand response times of the match engine if they were to submit an order at a given time. However, it should also be appreciated that information calculated or estimated that is disseminated to market participants should be as accurate as possible to minimize market participant risk. The estimate or prediction is only valuable if it is reliable, consistently calculated, and as accurate as possible.

Moreover, the estimate is valuable if it is communicated quickly, i.e., faster than the information that is the subject of the estimate. For example, as the prediction ages, it may lose value as it may no longer be representative of the current state. Therefore, the estimate needs to be generated and communicated as quickly as possible. In one embodiment, the disclosed systems may send the prediction information along with the time at which they were generated, so that recipients could assess the age of the prediction to judge its relevance.

Moreover, due to the architecture of the match engine and the exchange system, a message is only disseminated to market participants when that message reaches the publish component 410. In other words, because messages move along the match engine module sequentially, and are not published until the end of the match engine module sequence, relevant events that occur at different stages cannot be published until messages associated with those relevant events reach the publish component. This causes a delay in information. In other words, because there are multiple stages or structures in the match engine module, because incoming messages are processed sequentially, because market participants care about when messages enter certain stages and/or whether new order messages match with existing or resting orders or cause fills that may in turn generate hundreds of new messages, and because all of the resulting messages are published sequentially, there is often a large and varying delay between the occurrence of events, such as for example a message entering a match component, and when that event is reported or published to market participants. As discussed herein, such delays increase market participant risk, minimize certainty and are typically undesirable.

Messages wait in the pre-match queue. The time a message waits in the pre-match queue depends upon how many messages are ahead of that message (i.e., earlier messages), and how much time each of the earlier messages spends being serviced or processed by the match component. This wait time may be viewed as a latency that can affect a market participant's trading strategy. In one embodiment, the response that is calculated and sent to market participants may be wait time, or the amount of time a message will have to wait before it can enter the match component.

The match component attempts to match aggressing or incoming orders against resting orders. If an aggressing order does not match any resting orders, then the aggressing order may become a resting order, or an order resting on the books. For example, if a message includes a new order that is specified to have a one year time in force, and the new order does not match any existing resting order, the new order will essentially become a resting order to be matched (or attempted to be matched) with some future aggressing order. The new order will then remain on the books for one year. On the other hand, a new order specified as a fill or kill (e.g., if the order cannot be filled or matched with an order currently resting on the books, the order should be canceled) will never become a resting order, because it will either be filled or matched with a currently resting order, or it will be canceled. The amount of time needed to process or service a message once that message has entered the match component may be referred to as a service time. The service time for a message may depend on the state of the order books when the message enters the match component, as well as the contents, e.g., orders, that are in the message.

In one embodiment, orders in a message are considered to be "locked in" upon reaching and entering the match component. If the terms of the aggressing order match a resting order when the aggressing order enters the match component, then the aggressing order will be in one embodiment guaranteed to match. In many cases, knowing that an order has entered a match component is enough information to make other market decisions. The order may or may not match against other resting or other future orders, but market participants would like to know when the match component is attempting to match an order, or when an order has hit the book.

Although a market participant cannot be sure as to whether orders in a message will actually result in a fill, at least a market participant can be certain that a proposed order is being considered or attempted to be matched when the corresponding message enters the match component. Thus, how quickly a message can enter the match component may be an important event for a market participant. In other words, a market participant may care most about what is the current wait time to enter the match component. As noted above, the wait time, or the amount of time a message will spend waiting to enter the match component, depends upon how many messages are ahead of that message (i.e., earlier messages), and how much time each of the earlier messages spends being serviced or processed by the match component. The estimate or prediction that is distributed to market participants may be the amount of time it would take for a message to enter the match component, or the wait time. In other words, the estimate represents how much time a given message, if added at that moment to the pre-match queue, would have to wait before entering the match component. Thus, the distributed and calculated amount may be a "wait until serviced" time, or how much time a message would have to wait before it is serviced by the match component. A service time may be the amount of time that the message spends being serviced or processed in the match component.

The estimate may be a minimum response time, because the market condition prediction module may not be able to predict all aspects of a match engine. In particular, the market condition prediction module may not be able to predict how many messages will actually be in the match engine when a new message is received. The market condition prediction module in one embodiment instead estimates how long the messages of different types typically spend being serviced (or matched or attempted to be matched) in the match component and sums up the time estimate for each message in a queue and provides the sum as a total estimate.

The amount of time a match component spends processing, matching or attempting to match a message depends upon the type of message, or the characteristics of the message. This information may be used to provide a highly accurate, quick estimate of a current response time, time to wait for service, or latency of an engine as described herein.

The market condition prediction module may be applicable to any transaction processing system that includes a processor and an associated FIFO queue that holds messages as they wait to enter the processor. The estimate is especially important in an application such as the match engine of a financial exchange where the entry into the processor is an especially important event for market participants. In a financial exchange match engine, market participants care about when a message enters a match component, because as discussed herein, the instructions or the contents of the match engine are considered "locked in" only upon entry into the match component.

The time spent inside the processor may be considered to be a service time, e.g., the amount of time a message spends being processed or serviced by the processor. By considering the characteristics of previous messages that have been serviced by the processor, the market condition prediction module can estimate how much time each message that is in the associated preceding queue (e.g., pre-match queue for the match component; and the post-match queue for the publish or distribution component) will spend being serviced. By summing each of the estimates for each message in the pre-match queue, the market condition prediction module can provide an estimate of how much time a new message added to the end of the queue will spend in the queue waiting to be serviced by the match component.

The number of matches or fills that will be generated in response to a new order message will depend on the state of the books and the resting orders at the time the new order message enters the match component. The state of the match engine can vary depending on the contents of incoming messages. The estimated time may reflect how long a message may have to wait in the pre-match queue to enter the match component, and/or how long a message may have to wait in the post-match queue to enter the publish component or be published.

It should be appreciated that the match engine's overall latency is in part a result of the match engine processing the messages it receives. The match component's service time may be a function of the message type (e.g., new, modify, cancel), message arrival rate (e.g., how many orders or messages is the match engine module receiving, e.g., messages per second), message arrival time (e.g., the time a message hits the inbound MSG or market segment gateway), number of fills generated (e.g., how many fills were generated due to a given message, or how many orders matched due to an aggressing or received order), or number of Mass Quote entries (e.g., how many of the entries request a mass quote).

In one embodiment, the time a message spends:

Being converted in the conversion component 402 may be referred to as a conversion time;

Waiting in the pre-match queue 404 may be referred to as a wait until match time;

Being processed or serviced in the match component 406 may be referred to as a matching time;

Waiting in the post-match queue 408 may be referred to as a wait until publish time; and Being processed or published via the publish component 410 may be referred to as a publishing time.

It should be appreciated that the overall response time may be estimated as the sum of the conversion time, wait until match time, matching time, wait until publish time, and publishing time. In systems where some or all of those times are negligible, or consistent, an estimated response time may only include the sum of some of those times. Or, a system may be designed to only estimate one of the times that is the most variable, or that dominates the overall response time. For example, some market participants may only care about how long a newly sent message that is added to the end of the pre-match queue will spend waiting in the pre-match queue. Other market participants may care about how long that market participant will have to wait to receive an acknowledgement from the match engine that a message has entered the match component. Yet other market participants may care about how much time will pass from when a message is sent to the match engine's conversion component to when match component results exit or egress from the publish component. Using the techniques described herein, market condition prediction module may be used to accurately and quickly estimate any one or all of the times associated with match engine structures and provide such times to market participants.

Figure 4B:
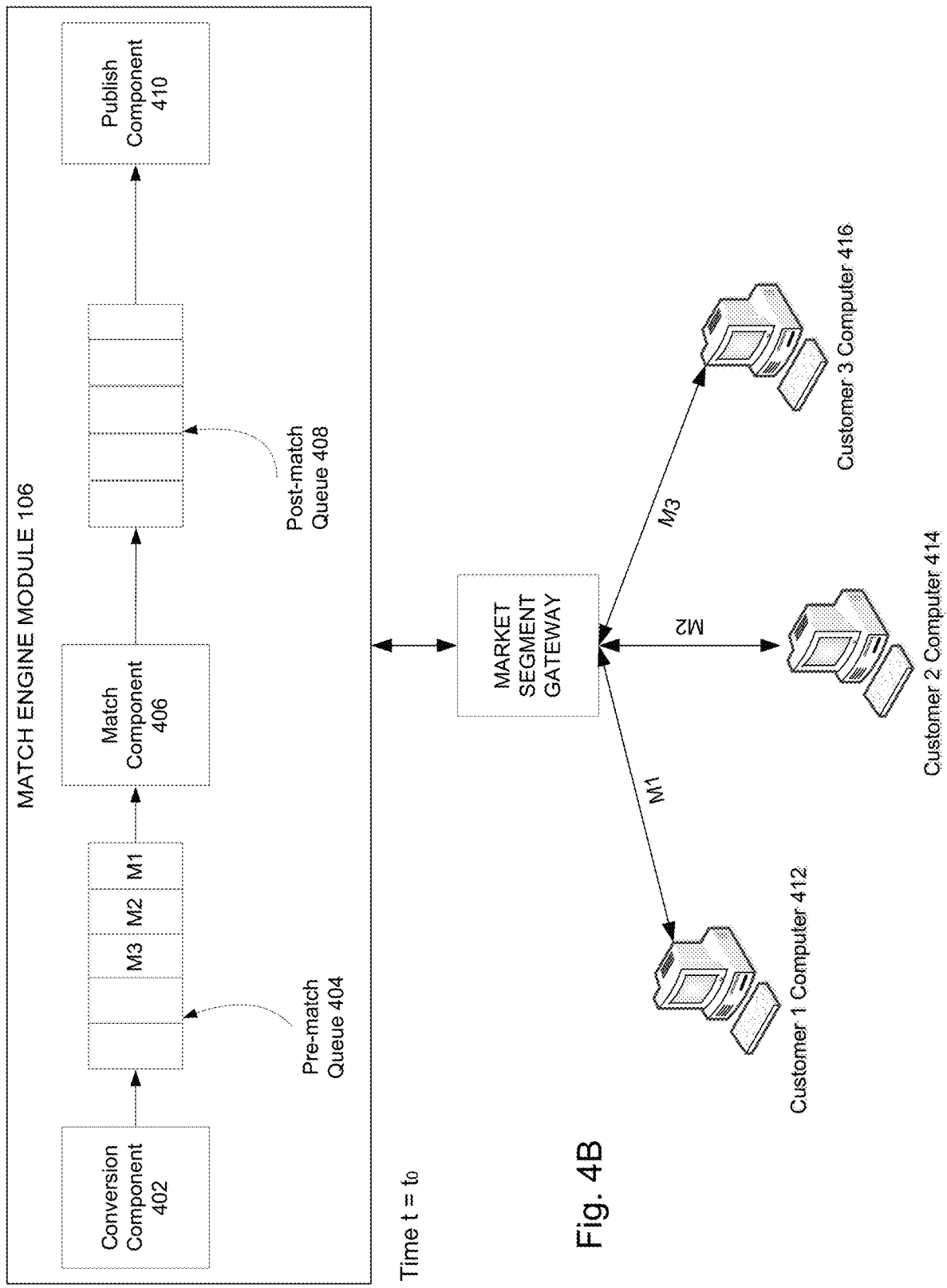
FIG. 4B depicts another example match engine module for implementing the disclosed embodiments.

FIG. 4B illustrates an example match engine module 106 processing messages M1, M2, M3 at time $t=t_0$. Messages M1, M2, M3 may be new orders received from various customers. For example, in the illustrated embodiment, Customer 1 Computer 412 submits message M1, then Customer 2 Computer 414 submits message M2, and then Customer 3 Computer 416 submits message M3. The three messages are converted into an appropriate format by the conversion component 402 and are placed in sequential order into pre-match queue 404. In particular, message M1 is placed into the pre-match queue 404 first, message M2 is placed into the pre-match queue 404 next, and then message M3 is placed into the pre-match queue 404. As shown, message M1 which was received by the match engine module 106 first is the closest to the match component 406. Match component 406 may be processing or matching previously received orders. Or, match component 406 may be empty, indicating little or no matching activity.

Figure 4C:
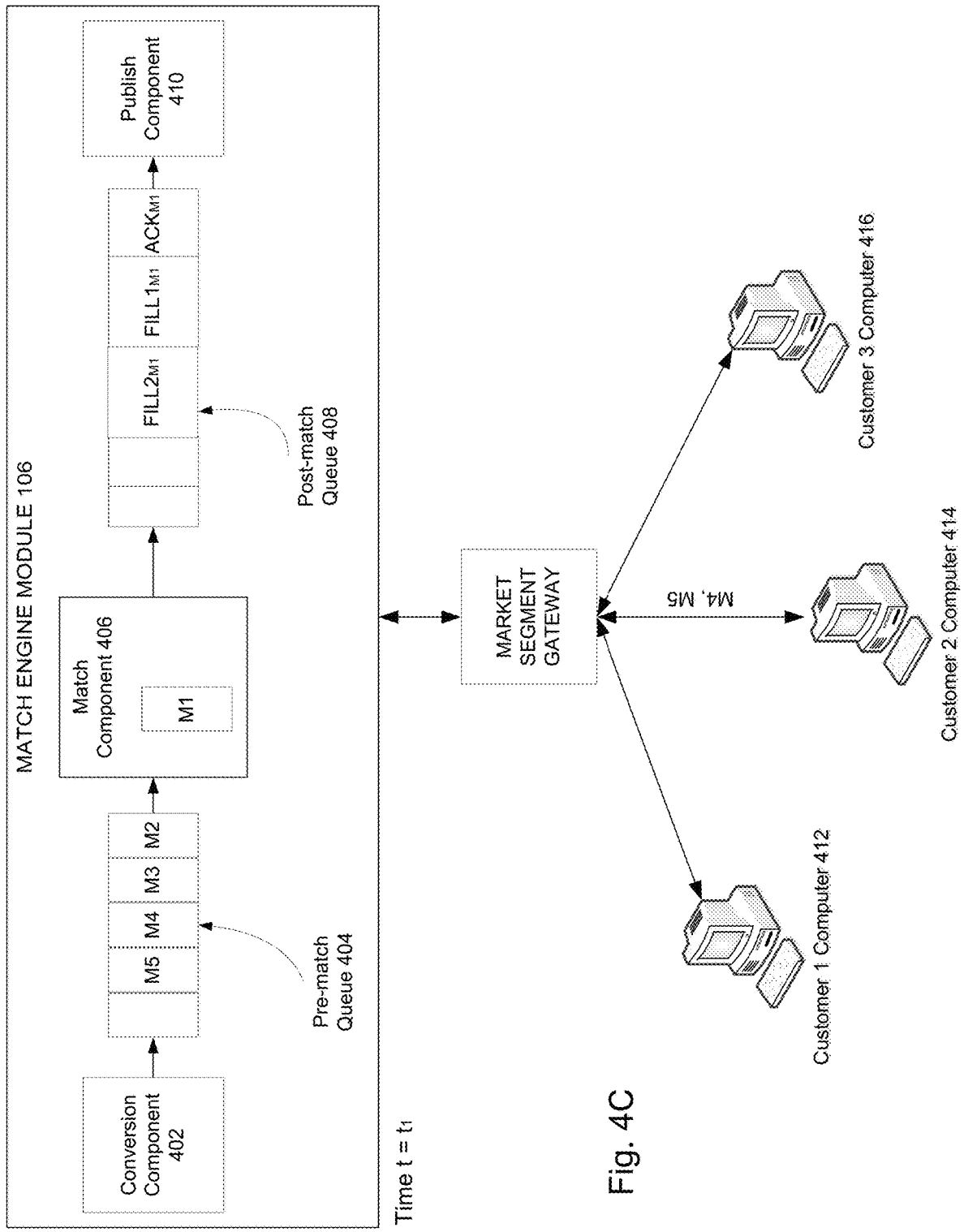
FIG. 4C depicts another example match engine module for implementing the disclosed embodiments.

As illustrated in FIG. 4C illustrating match engine module 106 at time $t=t_1$ later than time $t=t_0$, message M1 then enters match component 406. The pre-match queue 404 now holds messages M2 and M3, as well as any newly received order messages, such as messages M4 and M5. For example, Customer 2 Computer 414 may send new orders via messages M4 and M5. New messages M4 and M5 are placed in the pre-match queue in the order they were received by the match engine module. In particular, as shown in the illustrated example of FIG. 4C, messages M4 and M5 are placed after messages M2 and M3.

Customer 1 may be employing trading strategies that depend upon whether or not the trades in message M1 have entered or matched orders in the match component. It should be appreciated that Customer 1 (the sender of message M1) would want to know that message M1 has entered the match component as soon as message M1 enters the match component.

Moreover, customers at time $t=t_0$ would want to know how long a hypothetical message, e.g., a message not yet sent, e.g., M4, would wait in the pre-match queue 404 if that message was added to the end of the pre-match queue at time $t=t_0$. The market condition prediction module can estimate any one or more of wait times, matching times, overall response times, etc. as described herein.

Match component 406 processes message M1. Message M1 may be an order to buy a futures contract. Or, message M1 may be a butterfly spread of futures contracts including one buy, two sells, and one buy at different times. Depending on the contents of message M1 and the state of the order book, message M1 may match multiple resting orders, or may not match any resting orders.

Match engine module 106 generates response messages, or match component results or transaction component results, in response to processing message M1. For example, the exchange system may be configured to send an acknowledgement message back to each customer that sends in an order message. Or, the exchange system may be configured to send fill messages whenever an aggressing or entered order matches a resting order on the books. For example, if message M1 includes an order that matches a resting order previously submitted by Customer 3, the exchange system sends fill messages to both Customer 1 (who submitted message M1) and Customer 3 (who submitted the resting order matched by message M1). Thus, the processing or matching of message M1 generates match component results, namely, an acknowledgement message $ACK_{M1}$ and fill messages $FILL1_{M1}$ and $FILL2_{M1}$. Message $ACK_{M1}$ may be sent to Customer 1 acknowledging that message M1 has entered the match component. Message $FILL1_{M1}$ may be sent to Customer 1 indicating that its aggressing order M1 was filled. Message $FILL2_{M1}$ may be sent to Customer 3 indicating that one of its resting orders was filled. These newly generated messages are placed in the post-match queue 408 where they await to be published. For example, the publish component 410 may include other messages that need to be published to market participants or sent to market data feeds.

A system may generate a variety of result messages, including but not limited to acknowledgement messages and fill messages. For example, the match component may generate any of the following types of match component results:

New Order Acknowledgements;
Modify Order Acknowledgements;
Cancel Order Acknowledgements;
Mass Quote acknowledgment;
Order Rejects;
Fills;
Banding Updates;
Limit Updates;
State Change messages; or
Security Definition messages.

The above list is an example, non-limiting list of the types of results messages that may be placed in the post-match queue following the match component or processor.

Figure 4D:
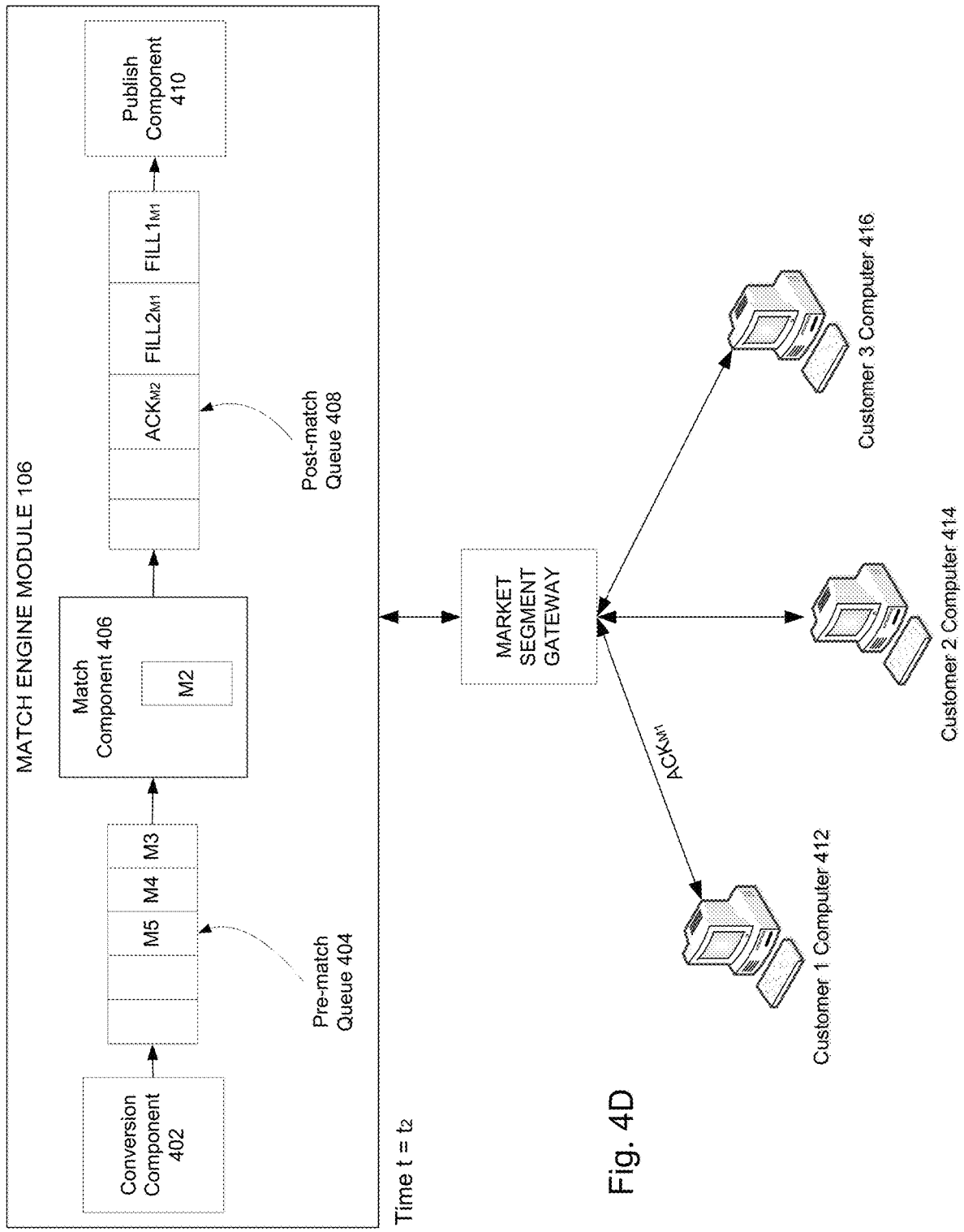
FIG. 4D depicts another example match engine module for implementing the disclosed embodiments.

FIG. 4D illustrates a later state of the match engine module 106 at time t=$t_2$ later than time t=$t_1$. Once the match component finishes processing message M1, message M2 sequentially enters the match component 406. Match engine module 106 generates an acknowledgment message $ACK_{M2}$ in response to message M2 entering the match component. Acknowledgment message $AKC_{M2}$ acknowledges that message M2 has entered the match component. Message $AKC_{M2}$ will be sent to Customer 2 once the other messages in the post-match queue 408 are sequentially processed. Thus there will be an undesirable delay between when match component 406 has begun to process message M2 and when the owner or sender of message M2 is notified that match component 406 has begun to process message M2. In particular, message M2 entered match engine module 106 at time t=$t_0$, but match engine module will only publish $AKC_{M2}$ after fill messages $FILL1_{M1}$ and $FILL2_{M2}$ have been published or distributed. In data and time sensitive applications, such as electronic trading in financial futures exchanges, such a delay in sharing information can adversely affect trading strategies and increase risk.

Moreover, fill messages sent to customers may also be delayed. As noted above, the match component may also match aggressing or received orders with resting orders, and such matches may generate dozens, or perhaps hundreds or thousands, of fill messages that inform market participants that their orders have matched. However, these messages are also processed sequentially, and may not reach market participants in a timely fashion.

It should be appreciated that a given market participant will not know about messages sent in by other market participants. Thus, in one embodiment, a market participant may at best know what messages have been sent by that market participant, but would not know about any other messages sent by other market participants. In one embodiment, the messages sent by other customers ahead of a given customer's message are private and unknown to the given customer sending the current message.

Figure 4E:
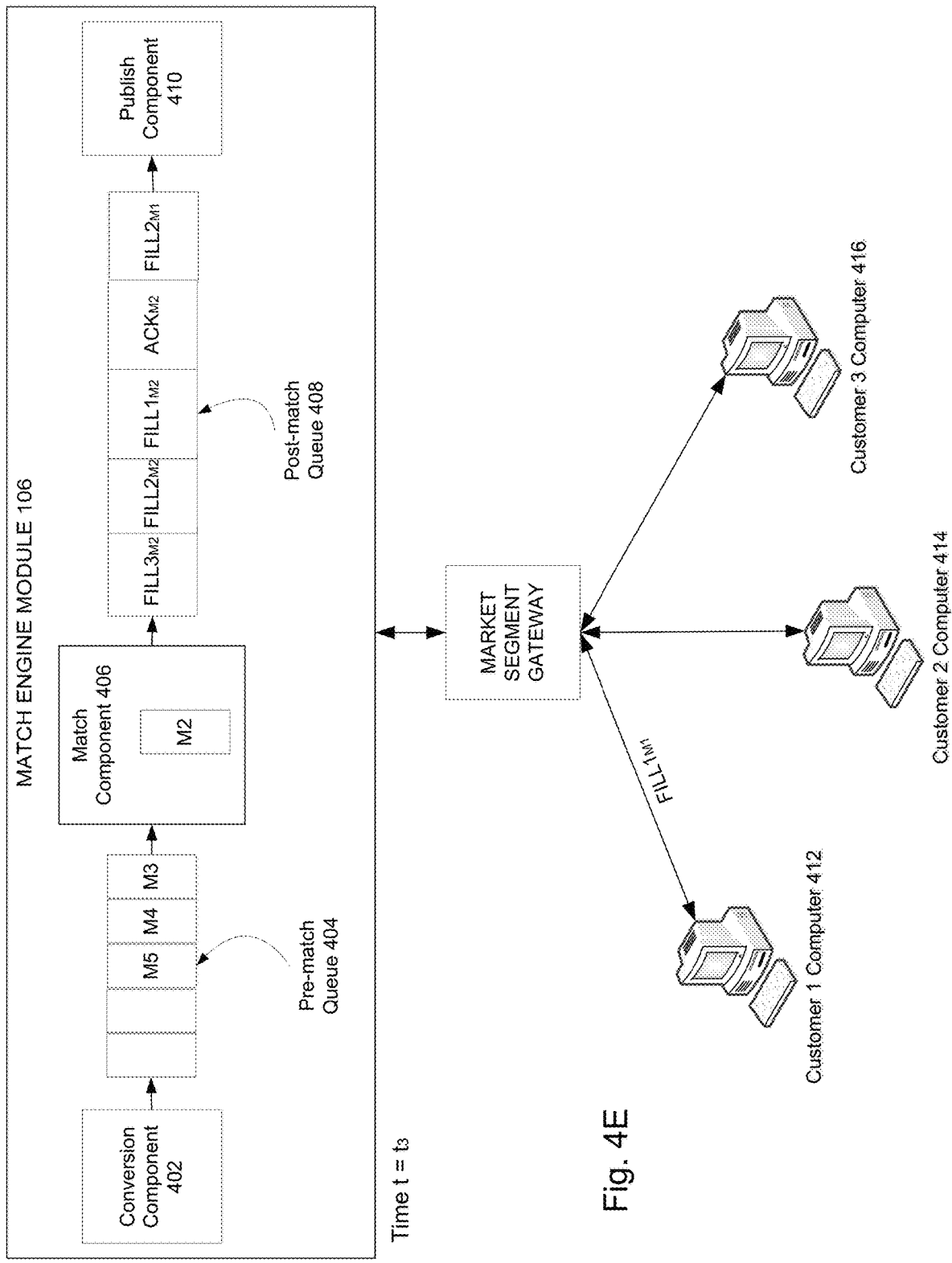
FIG. 4E depicts another example match engine module for implementing the disclosed embodiments.

As shown in FIG. 4E, at time t=$t_3$ later than time t=$t_2$, match component 406 is still processing message M2. Aggressing orders in message M2 have matched several resting orders, resulting in the generation of multiple fill messages $FILL1_{M2}$, $FILL2_{M2}$, and $FILL3_{M2}$. In one sense, some market participants may value such fill messages even more than acknowledgment message $ACK_{M2}$ because fill messages mean that orders have actually matched, or that orders sent in will be fulfilled. As noted above, an acknowledgment message only indicates that the match component received an order.

As illustrated in FIG. 4E, fill messages $FILL1_{M2}$, $FILL2_{M2}$, and $FILL3_{M2}$ are sequentially placed in post-match queue 408. Fill message $FILL3_{M2}$, for example, will not be published to the appropriate customer until all the messages in the post-match queue ahead of $FILL3_{M2}$, namely, $FILL2_{M1}$, $ACK_{M2}$, $FILL1_{M2}$, and $FILL2_{M2}$, have been sequentially published in that order. Thus, the customer that is the target recipient of $FILL3_{M2}$ will not be able to act on the information contained in $FILL3_{M2}$ until a later time, even though that information already exists in the match engine module 106.

Market participants view such delays as trading risks. Moreover, such delays fluctuate, depending on how many messages are ahead of any given message. For example, in the illustrated embodiments of FIGS. 4B to 4E, if processing or matching of message M1 had generated hundreds of response messages, e.g., fill messages, then the acknowledgment message $ACK_{M2}$ and fill messages $FILL1_{M2}$, $FILL2_{M2}$, and $FILL3_{M2}$ in response to message M2 would be even further delayed. It should therefore be appreciated that the time required to inform market participants that their messages have been received by the match component or that their orders have generated hits or fills or matches depends on the current state of the match engine module.

Thus, there may be an undesirable and unpredictable delay between when important match engine information occurs and when market participants are notified about the occurrence of such important match engine information. To account for this uncertainty, market participants often submit test messages to check the current response time of the match engine. Many market participants may only submit their actual orders if the test messages receive a quick response, indicating that the match engine activity is low or that the match engine has a fast response time. Such messages represent an unnecessary burden on the match engine, because each message is processed as a standard order message.

Providing an estimate or prediction of current match engine response time reduces the number of empty or low risk messages sent by market participants. The response time could be some or all of the different times associated with the individual structures described above. Such an estimate also provides better match engine information to market participants, decreasing their risk and improving the data available to employ market strategies. In some cases, customers cancel their new orders if an acknowledgment for a new order is not received within a predetermined time.

One way of indicating an expected delay could be to provide market participants with the current queue size. Queue size information could provide an indication as to how active the match engine module is, and how much latency may be expected. In one embodiment, the exchange system may predict response time based solely on current queue size. However, such an estimate may not be useful, and may not be reliable. For example, the effects of different message types may be different, and just providing a number of how many messages are in the queues would not be sufficiently reliable. An estimate that is not sufficiently reliable could create even more uncertainty and risk for market participants.

In one embodiment, the latency may be the overall time to process a message, which may include the amount of time needed to generate and publish acknowledgment or fill messages based on the message. In one embodiment, the match component of the match engine may process an incoming message. Generating and publishing acknowledgment or fill messages resulting from processing the incoming message may also be considered to be part of processing the original, incoming message. For example, a message containing a new order may be received by the match engine and placed in the pre-match queue, and then sequentially processed by the match component. Once the match component performs or attempts to perform the actions specified by the new order message, e.g., match a resting order at the specified quantity and price, the new order message is discarded by the match component, and resulting acknowledgements and fills are then placed, in the order they were generated, in the post-match queue. These acknowledgements and fills are different from the new order message, but are an effect of the original new order message because they are the results of the instructions in the new order message. Thus, although the resulting acknowledgement and fill messages are different from the new order message, generating and publishing resulting acknowledgements and fills may be considered to be part of processing the new order message.

It should be appreciated that the match engine module 106 is an example of a transaction processing system that can implement the disclosed systems and methods. The transaction processing system may include a pre-transaction queue coupled with a transaction component that matches or processes the messages it receives. The transaction processing system may also include a post-transaction queue coupled with a distribution component that distributes messages to other computers, e.g., market participant computers.

Figure 5:
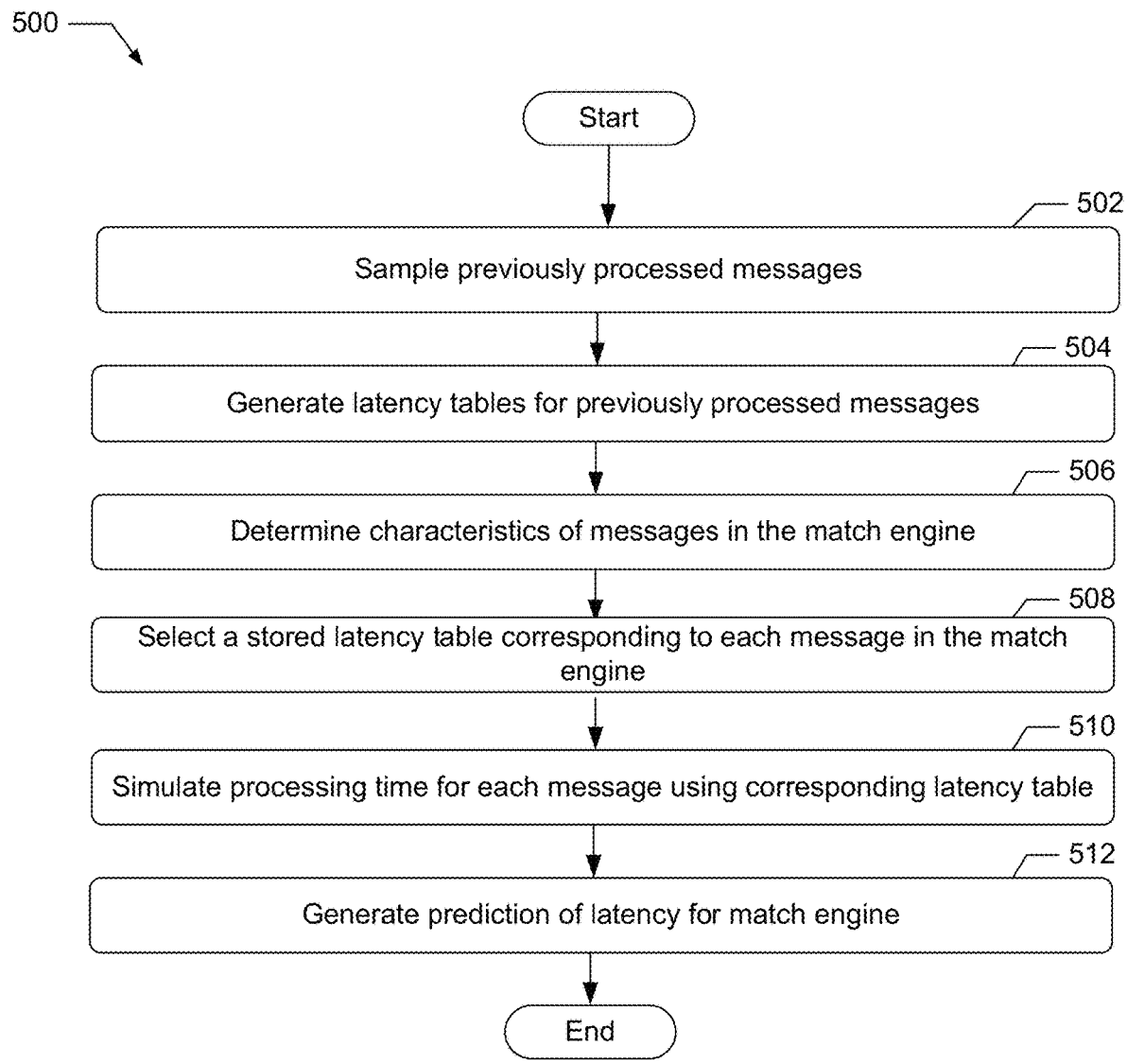
FIG. 5 is an example flowchart for implementing the disclosed embodiments.

FIG. 5 is a flowchart indicating a method of predicting current response time or current latency for incoming orders as extracted from messages, as may be implemented with computer devices and computer networks, such as those described with respect to FIG. 2. Again, the predicted latency may reflect a prediction for how much time a message (and/or its associated match component results) spends in one or some of the structures of the match engine.

The incoming orders may be considered transactions to buy or sell a financial product, or to modify or cancel an existing order to buy or sell the financial product. Embodiments may involve all, more or fewer actions indicated by the blocks of FIG. 5. The actions may be performed in the order or sequence shown or in a different sequence.

To facilitate predicting market conditions and response times, the exchange system may in one embodiment sample and analyze historical data to generate latency tables or distributions. In one embodiment, the latency distribution may include a range of possible timing outcomes and associated probabilities for each outcome. For example, the exchange system may sample one out of every 300 previously processed messages to analyze the actual response time or actual processing time for the sampled message (block 502). The actual response time or actual latency or sampled time may be the time actually needed or the time it actually took to perform certain actions in the match engine module, e.g., the time it took for a message to enter the match component, the time the match component spent processing or servicing the message, the time it took for a fill or acknowledge message to be sent after being generated, the time a message spent in the pre-match and/or post-match queue, the time from the match engine module receiving a message to publishing messages responsive to the message, etc.

In one embodiment, the sampled messages are checked for how long the message spent being serviced in a processor, e.g., how much time did a message spend being serviced in the match component, or how much time did a message spend being serviced in the publish component.

The exchange system may sample messages in a given time window, e.g., the last seven days. Or, the system may sample messages received at the same time each day, and/or on the same day of the week. Thus, the exchange system may build a database of historical response time or actual latency data (which in turn may be for how long that message spent in one or some of the structures of the match engine) for messages having different characteristics.

The sampled data may be used to generate unique latency probability tables or distributions for messages of different types or having different characteristics (block 504). In other words, the exchange system may generate and store hundreds of probability distributions for latencies for messages having various combinations of characteristics. It should be appreciated that the exchange system may be configured so that the resolution of the message characteristics can be refined as appropriate. For example, the exchange system may store latency tables or distributions across only one variable, such as message type, which can be any one of new, modify or order. Thus, the exchange system may in one embodiment generate and store three latency distributions based on data sampled over a rolling seven-day window: latency distributions for new order messages, modify order messages, and cancel order messages. Alternatively, the exchange system may generate dozens or hundreds or even thousands of latency distributions for messages across any combination of multiple characteristics or variables including message type, price, quantity, market participant side, time in force, etc. For example, the market condition prediction module may sample a time window immediately preceding the generation of the prediction, such as sampling from a rolling window of 10 minutes or the prior 100 transactions. Or, the market condition prediction module may sample from related calendar periods, such as for example, sampling from the same calendar from the previous year or years. For example, the market condition prediction module may sample Sep. 30, 2014 data to predict latencies on Sep. 30, 2015. Or, the market condition prediction module may sample data from September 30 from 2010 through 2014 to predict latencies on Sep. 30, 2015. The calendar periods could be days, weeks, months, or quarter ends. Or, the calendar periods could be correlated to events like the release of economic indicators or quarterly reports.

Again, the latency distributions can represent any information regarding the time spent in one or some of the structures or steps of the match engine.

Figure 6:
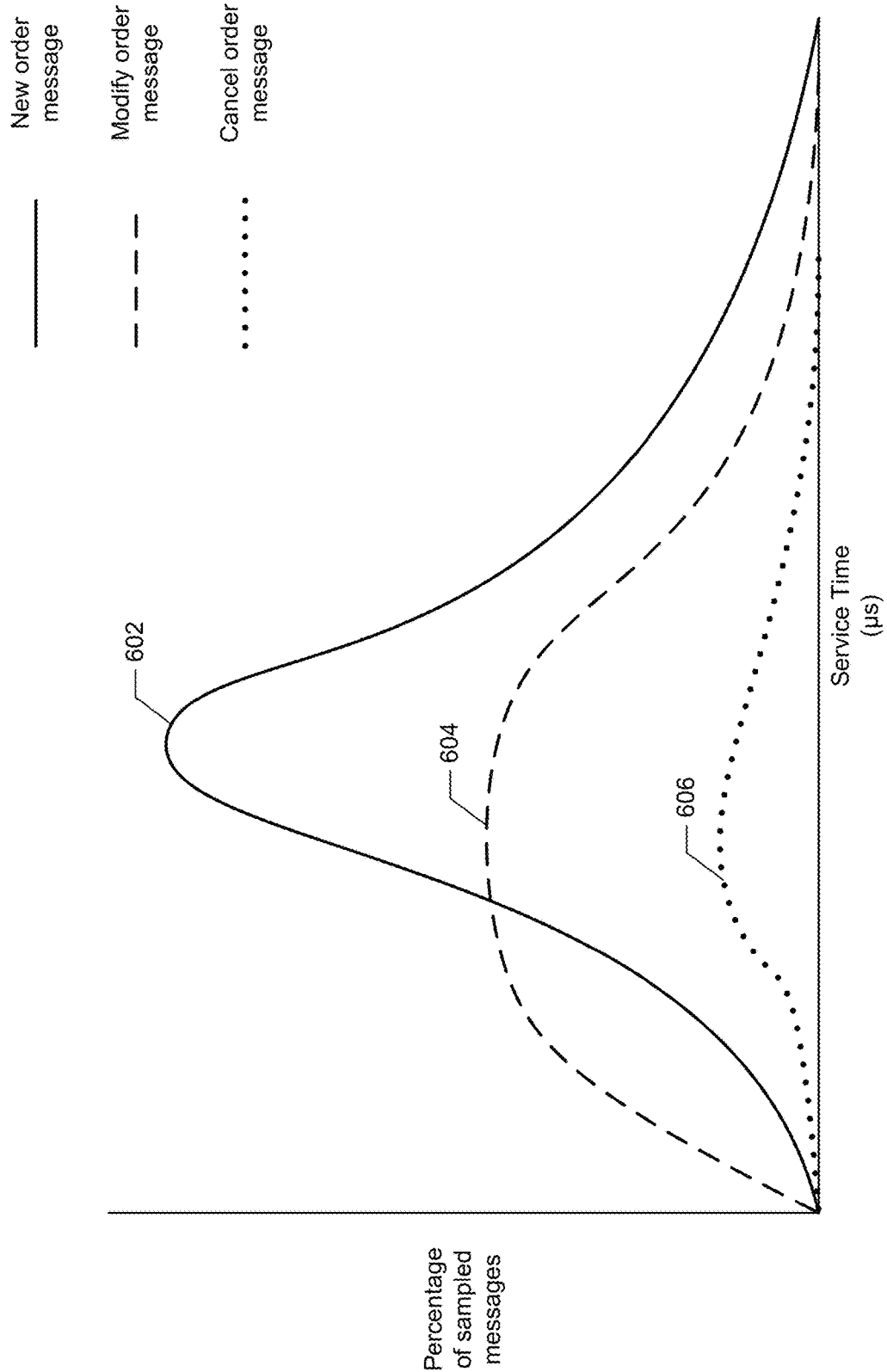
FIG. 6 depicts example latency distributions of sampled messages processed by an example exchange system.

FIG. 6 illustrates examples of three types of latency distributions that may be utilized in process 500. Although three example distributions are illustrated (one for each of new order messages, modify order messages and cancel order messages), many more distributions could be generated and used. For example, the market condition prediction module may generate and use forty distributions for new order messages having forty different characteristics or combinations of characteristics.

In the example of FIG. 6, curve 602 displays a distribution of the percentage of sampled new order messages that required an associated amount of time to be processed or serviced by the match engine. Curve 604 displays a distribution of the percentage of sampled modify order messages that required an associated amount of time to be processed or serviced by the match engine. Curve 606 displays a distribution of the percentage of sampled cancel order messages that required an associated amount of time to be processed or serviced by the match engine. It should be appreciated that the data used to generate the distributions is based on sampled actually-processed messages.

The distributions could alternatively or additionally reflect how much time was spent in the publish component.

It should be appreciated that in one embodiment the sampled messages should include the time the message actually spent being serviced by a thread or component or processor, but should not include how long that message waited in a queue. In a FIFO or sequential system, the time spent waiting in a queue is largely a result of the other earlier messages in the queue. Earlier messages in a queue at any given time is a random event and a reflection of the current state of the queue. A fair and efficient system that seeks to provide accurate results should avoid the use of or reliance on state-specific data that is independent of a newly received message.

For example, a message received by the match engine when the pre-match queue is full may take a long time to reach the match component. That same message received by the match engine when the pre-match queue is empty will quickly reach the match component. Yet, in either case, the amount that message spends in the match component is unrelated to how long that message waited in the pre-match queue.

In other words, the amount of time a given message spends being serviced by the match component depends on the contents and characteristics of the given message, as well as the current state of the order book. But, the amount of time a given message waits in the pre-match queue depends on the messages (or earlier messages) ahead of the given message, and how long those earlier messages spend being serviced by the match component.

Thus, how long the message waits in the pre-match queue depends on the queue, not the message or its characteristics. Thus, the system should only look at how much time a sample message spent being serviced, not how much time a sampled message spent in a queue.

The latency information may in one embodiment be stored as a table of latency data. The latency distributions may be generated from the latency tables. Table 1 below is an example of a latency table used by the market condition prediction module. The latency table or a latency distribution may be generated by analyzing all inputs (New orders, Modify Orders, and Cancel orders, respectively) to the matching engine. The latency reported for these three message types may be for example the distribution of time that all messages of each type spent in the matching component of the engine.

TABLE 1

| Percentile | New Orders (µs) | Modify Orders (µs) | Cancel Orders (µs) |
| --- | --- | --- | --- |
| 0.001 | 122.6241045 | 126.5963008 | 108.4039082 |
| 0.002 | 123.7719876 | 126.8872539 | 108.6648458 |
| 0.003 | 124.3427929 | 127.2587072 | 108.8370297 |
| 0.004 | 124.7006552 | 127.6822957 | 108.9759515 |
| 0.005 | 125.0200283 | 128.0665696 | 109.0964678 |
| — | — | — | — |
| 0.995 | 381.8269956 | 240.5927405 | 151.6194002 |
| 0.996 | 414.787362 | 249.4662959 | 157.9291398 |
| 0.997 | 483.6908359 | 265.6838496 | 162.6016954 |
| 0.998 | 646.6508222 | 279.6899474 | 172.6337123 |
| 0.999 | 1058.54867 | 564.4490517 | 185.7271271 |

The market condition prediction module 142 of exchange system 100 at any given time predicts current response times or latencies by analyzing messages in the pre-match queue and/or the post-match queue and simulating message flow over time by using the appropriate latency distribution. In one embodiment, the exchange system may include a service time distribution observed in production for the match engine to determine latency distribution.

For example, at a given time, a pre-match queue may include five messages, and a post-match queue may include ten messages. The market condition prediction module 142 may analyze each of the fifteen messages to determine characteristics for each message. Referring back to FIG. 5, in one embodiment, the market condition prediction module 142 determines characteristics of messages currently in the match engine (block 506). In one embodiment, the market condition prediction module 142 determines characteristics of messages currently stored or queued in the pre-match queue. In one embodiment, the market condition prediction module 142 determines characteristics of messages currently in the post-match queue. In one embodiment, the market condition prediction module 142 determines characteristics of messages currently in the pre-match queue as well as characteristics of messages currently in the post-match queue.

The market condition prediction module 142 selects a stored latency table or distribution for each message in the match engine (block 508). In particular, the market condition prediction module 142 selects a latency distribution based on the characteristics of each message in the match engine, for example, in the pre- and/or post-match queue. For example, for a new order message in the pre-match queue, the market condition prediction module 142 would select a distribution for how long sampled, previously processed new orders spent being matched. For a message in the post-match queue, the market condition prediction module would select a distribution for how long sampled, previously processed messages spent being published.

From an architectural and timing standpoint, in a FIFO system, a processor, component or thread is associated with the queue preceding that processor. Thus, a queue and its processor or component may be seen as a corresponding pair within a transaction processing system. To estimate how long a given message will wait in a queue, the system looks at how many messages are ahead of the given message, what are the characteristics of those earlier messages, and how long did it actually take to process (e.g., match, or publish) previously processed messages characteristically similar to the earlier messages.

When predicting the wait time of a given queue leading to or coupled with a specific processor, the market condition prediction module looks at how long messages spent in the corresponding processor. The pre-match queue precedes the match component. The post-match queue precedes the publish component. In one embodiment, the post-match queue may be referred to as a pre-publish queue.

If the system is estimating how long a hypothetical message added to the end of the pre-match queue will wait in the pre-match queue, the system will look at the earlier messages currently in the pre-match queue (i.e., messages ahead of the hypothetical message), and how long it took to match similar, sampled (and thus previously matched) messages in the match component.

If the system is estimating how long a hypothetical message added to the end of the post-match queue will wait in the post-match queue, the system will look at the earlier messages currently in the post-match queue (i.e., messages ahead of the hypothetical message), and how long it took to publish similar, sampled (and thus previously published) messages in the publish component.

The market condition prediction module may be generalized to be a prediction module for any system including a processor or component coupled with a queue preceding that processor or component. In one embodiment, the process being analyzed is a monitoring process, and thus the system looks at a monitoring processor or component and the queue leading up to or coupled with the monitoring component (e.g., a pre-monitor queue). The message characteristics may be characteristics related to monitoring that affect how long that message will spend in the monitoring component or processor.

The prediction module may output a prediction that may be used to establish baseline performance times, and the prediction may be monitored to watch for high deviations from threshold amounts. Monitoring a latency prediction may alert the exchange that the system is experiencing some system degradation.

In one embodiment, the system may record observed response or processing times. For example, the system may record the amount of time a message actually spent waiting in the pre-match queue, and compare that observed time to a previous prediction for that time. Thus, any of the predictions calculated by the system may be compared with the actual wait or processing times. For example, the system may record the amount of time a message actually spent in the match component. Or, the system may record the amount of time a message actually spent in the post-match queue, etc. Thus, the system can record the amount of time a message actually spends in one or more of the structures of the match engine. The system can then compare any previously predicted time with a corresponding actually observed time. It should be appreciated that the observed time is recorded after the message has been processed or has passed the corresponding stage or structure in the match engine.

The system in one embodiment may plot the prediction times versus their corresponding observed latency times on the same set of axes. The plot may accordingly simultaneously illustrate both expected latency and actual latency. Any differences between predicted times and observed times may be used to generate alerts indicating higher than expected latencies, or lower than expected latencies, depending on whether the actual observed time is higher or lower than the predicted time. Users may be able to pinpoint certain areas of the plot and view historical details about the state of the match engine and the overall system state at various times. In one embodiment, the state of the market at each moment may be captured and stored, so that past events could be recreated via a replay device. Such a replay device would allow operators of the financial exchange to recreate the events that led to a greater than expected latency, for example.

It should be appreciated that a monitoring application as described herein could allow operators of a financial exchange to determine whether an observed market condition was "expected" or "unexpected" given the state of the market at that time. If market participants inquire as to why their orders experienced certain delays, the financial exchange may be able to explain whether the observed time was expected or unexpected, resulting in increased transparency and customer satisfaction.

In one embodiment, deviations between expected and observed latency may be used to further tune the market condition prediction module, making the market condition prediction feed more accurate.

A prediction module may be modified to be an expected wait module, which may be useful in customer service scenarios. For example, market participants may regularly call in to complain about high latencies for past orders. An expected wait module could be implemented to check what an expected wait was at any given moment in time in the past. A customer question about a high latency could be answered by explaining, for example, that the high latency a customer experienced was in fact expected (due to the messages ahead of that customer's message in question, for example) and not a technical or other problem with the exchange's system or infrastructure.

For a publish process, the message type or characteristic may be a characteristic about the type of router or gateway used by that message. Or, a message characteristic may be the IP (Internet Protocol) address associated with the message.

It should be appreciated that the market condition prediction module may use many types of characteristics to select latency distributions besides message type. For example, the market condition prediction module may look at the bid price for a specific product in a new message order, and select latency distributions based on new messages having a similar bid price for that same product.

The market condition prediction module 142 randomly selects, e.g., via a Monte Carlo simulation, the processing time for the new order message according to the latency outcomes and probabilities defined in the selected latency distribution (block 510). As may be known in the art, a Monte Carlo simulation may be used as a problem solving technique to approximate the probability of certain outcomes by running multiple trial runs, or simulations, using random variables. To improve prediction accuracy, in one embodiment, the market condition prediction module 142 may repeat this random selection many times, and calculate an average predicted latency or processing time. The market condition prediction module 142 may then generate the estimated latency based on the simulated processing times for the messages in the match engine (block 514).

It should be appreciated that the sum of the simulated latencies may represent a substantially accurate estimate or prediction of the response time a market participant would experience if his or her order had been submitted at that given time. In one embodiment, the sum of the simulated latencies may represent an estimate of the minimum response time a market participant would experience if his or her order had been submitted at that given time. In one embodiment, the sum may represent an estimate of how long a message newly added to the match engine will wait in one or more of the match engine's queues.

A response time for a message may be a service time in a processor plus the wait time in the queue for that processor. Or, a response time may be the sum of all the service times and all the wait times for all the processors and queues inside of an engine.

Referring to FIG. 4E, for example, the market condition prediction module's time calculation may be an estimate for events associated with a hypothetical message, e.g., M6 (not shown), if M6 were to be received by the match engine and added to the end of the pre-match queue 404 at a given time, e.g., time $t=t_3$. The market condition prediction module in one embodiment could estimate how long it would take for M6 to enter the match component 406, which may be an event that the sender of M6 may care about. To estimate a minimum wait time for M6 in the pre-match queue 404, the market condition prediction module may calculate how long it may take to process messages ahead of hypothetical message M6 in FIG. 4E, namely, M3, M4 and M5. The approximate match time or service time for M3, M4 and M5 may be calculated by looking at the characteristics of each of M3, M4 and M5; selecting actual match time distributions for messages similar to M3, M4 and M5; simulating, e.g., via Monte Carlo simulations a match time for M3, M4 and M5 based on the corresponding selected distributions; and summing up the simulated times for M3, M4 and M5. That sum in one embodiment informs market participants how long a newly added message may wait in the pre-match queue 404.

The market condition prediction module in one embodiment could additionally estimate, or add to the pre-match queue wait estimate, how long messages that are currently in the post-match queue 408, namely, FILL3$_{M2}$, FILL2$_{M2}$, FILL1$_{M2}$, ACK$_{M2}$, and FILL2$_{M1}$, would take to publish. It should be appreciated that these publish time estimates would add time or delay to the amount of time that match component results for M6 would have to wait to be published. This may be an event that market participants care about.

To estimate a minimum wait time for match component results for hypothetical message M6 in the post-match queue 408, the market condition prediction module may calculate how long it may take to process or service messages currently in the post-match queue 408 in FIG. 4E, namely, FILL3$_{M2}$, FILL2$_{M2}$, FILL1$_{M2}$, ACK$_{M2}$, and FILL2$_{M1}$. The approximate publish time or service time for FILL3$_{M2}$, FILL2$_{M2}$, FILL1$_{M2}$, ACK$_{M2}$, and FILL2$_{M1}$ may be calculated by looking at the characteristics of each of FILL3$_{M2}$, FILL2$_{M2}$, FILL1$_{M2}$, ACK$_{M2}$, and FILL2$_{M1}$; selecting actual publish time distributions for messages similar to FILL3$_{M2}$, FILL2$_{M2}$, FILL1$_{M2}$, ACK$_{M2}$, and FILL2$_{M1}$; simulating, e.g., via Monte Carlo simulations a publish time for FILL3$_{M2}$, FILL2$_{M2}$, FILL1$_{M2}$, ACK$_{M2}$, and FILL2$_{M1}$ based on the corresponding selected distributions; and summing up the simulated times for FILL3$_{M2}$, FILL2$_{M2}$, FILL1$_{M2}$, ACK$_{M2}$, and FILL2$_{M1}$. That sum in one embodiment informs market participants how long match component results (or transaction component results) for a newly added message may wait in the post-match queue 404.

It should accordingly be appreciated that the market condition prediction module 142 can estimate different response times depending on whether messages in the pre-match queue, post-match queue, or both, are analyzed by the market condition prediction module 142, as well as the resolution and characteristics of the latency distributions.

In one embodiment, the market condition prediction module provides a service time estimate for hypothetical message M6 based on M6's characteristics. For example, the market condition prediction module may output multiple latency estimates for messages of different types. For example, the market condition prediction module may output three market condition prediction feeds, one for each of new order messages, modify order messages, and cancel order messages. The number of feeds may be the number of different message types. The estimate for servicing M6 may be calculated by looking at historical data, as described above with respect to the earlier messages ahead of hypothetical message M6. For each possible message type, the market condition prediction module calculates how long a new message would take to be processed in the corresponding queue.

Referring to FIG. 4E, for example, if hypothetical message, e.g., M6 (not shown), were to be received by the match engine and added to the end of the pre-match queue 404 at a given time, e.g., time t=t$_3$, the market condition prediction module may estimate how long it would take for M6 to enter the match component 406, as described above, plus how long it would take to service M6 inside of the match component 406. The approximate match time or service time for M6 may be calculated by looking at the characteristics of M6; selecting actual match time distributions for messages similar to M6; simulating, e.g., via Monte Carlo simulations a match time for M6 based on the corresponding selected distributions; and adding the estimate of M6 service time to the estimate of M6 wait time. The M6 wait time, again, may be estimated by summing up the estimated service times for messages ahead of M6, namely, M3, M4 and M5. In one embodiment, the response time that is calculated and output to market participants may be the service time and the wait time for M6.

In one embodiment, the market condition prediction module of the exchange system 100 provides the prediction of current response time or latency to market participants. The market condition prediction module 142 may continuously calculate or estimate current response times and publish predicted times to market participants in an existing market data feed. As discussed herein, the exchange system publishes market data to market participants via market data feeds. The latency prediction may be incorporated into existing market data feeds. Thus, for example, market participants that subscribe to a market data feed for a specific market segment could additionally receive a latency or market condition prediction. Including this information in existing market data feeds increases the market participants' view into current match engine performance, and informs market participant strategies.

In one embodiment, instead of outputting a time estimate, the market condition prediction module outputs a latency score on a customized scale. For example, the market condition prediction module could output a current latency score on a scale from 1 to 10, where 10 indicates very high latency or wait and 1 indicates very low latency or wait. A latency score of 5 could represent a median or average wait time for that market. When a score is used, market participants may be able to better gauge the current latency relative to latencies at other times. For example, a market participant who regularly interacts with a given market may know that a latency score of 8 is too high to make certain trades requiring immediate entry. A latency score may also allow an exchange such as the CME Group to issue a standardized score, or a score on a shared or similar scale. The market condition prediction module may alternatively output information about the current latency in terms of latency units. For example, a "wait" may a latency unit implemented by an exchange. The exchange may output wait times in "waits" representing how long it would take for a message to wait in a given queue, depending on implementation.

The latency information may be calculated in real time, or near real time, and published with the existing market data feeds. The latency information may be recalculated or refreshed at a preselected interval, e.g., as often as the other market data in the market data feeds. Thus, market participants may be able to accurately understand current match engine performance. A market participant viewing a market data feed including the latency prediction on his or her market participant computer may make trading decisions based on the latency prediction. For example, a trader unsure about a trade may nevertheless decide to place an order if the latency prediction indicates that the latency is very low. Or, a trader or market participant computer about to submit a very large order may decide to wait because the latency prediction in the market data feed indicates a very high latency.

Alternatively, the exchange system may output a separate market condition prediction feed. The exchange system may provide an option for market participants to subscribe to the separate market condition prediction feed. Unlike a latency prediction that may be incorporated into an existing market data feed as discussed above, a separate market condition prediction feed could include latency predictions for all markets traded on the exchange system. Users could in one embodiment select the markets for which they would like to receive latency predictions. A market participant trading in multiple markets may decide to focus on a specific market based on predictions. For example, a market participant trading in the S&P 500 futures market and the energy market may decide to increase his or her trading in the S&P 500 futures market because of a very low latency prediction for the S&P 500 futures market and a normal to high latency prediction for the energy market.

Or, market participants may submit a message out of band to the exchange system requesting a market condition prediction, or a market condition inquiry message. The exchange system may provide the predicted response time in a market condition prediction message sent only to the requester. In this embodiment, the market condition prediction module only calculates a prediction in response to an inquiry by a requester. In one embodiment, to ensure that market participants have as much of a level playing field as possible or access to the same or similar information, the exchange system may distribute a latency prediction to all market participants via a feed or separate channel even if only one market participant requests a latency prediction.

In one embodiment, the exchange system may include predicted response time or predicted latency in various other communications or messages that the match engine already produces, such as acknowledgements, execution reports, fills and any other iLink or market data message.

In one embodiment, the exchange system may publish a feed that includes the estimate latency along with a delta latency value showing a difference in latency from a previous latency value. For example, the system may output or publish that the prediction for latency is or response time estimate is 5 nanoseconds less than the prediction for the latency one minute ago. Thus, market participants can see if the latency is increasing or decreasing over time.

It should be appreciated that a high latency or longer response time increase market participant risk because of an increase in the amount of time between when a trade is placed or submitted and when the trade enters the match component (in the match engine) or is processed (e.g., compared with other resting orders, or in the case of no matches, placed on the books as a resting order).

A market participant computer may automatically launch an application or visually notify a market participant about a low latency prediction. In one embodiment, a market participant computer may be configured to place a trade only if a latency calculation output by the market condition prediction module is below a predetermined threshold. Or, a market participant computer may be configured to output an alert if a user or computer attempts to place a trade and the latency calculation is above a predetermined threshold. Thus, the market participant computer behavior and configuration may change depending on the value of the latency prediction.

In one embodiment, the latency prediction may be an input to a market participant computer trading program. For example, a market participant computer may include a trading application or a user interface. The latency prediction sent from the exchange and received by the market participant computer may use the latency prediction as an input for determining which trades to place.

In one embodiment, a market participant computer may automatically place a trade as soon as a latency prediction for an associated market drops below a threshold. Or, a market participant computer may prevent a trade from executing if a latency prediction for an associated market rises above a threshold. In one embodiment, a market participant computer may cancel a trade if the latency prediction moves by a predetermined amount of time within a predetermined amount of time after sending a new order message. For example, a market participant computer may be configured to cancel a trade if the latency prediction increases by 20 nanoseconds within 5 nanoseconds after placing the trade.

Figure 7:
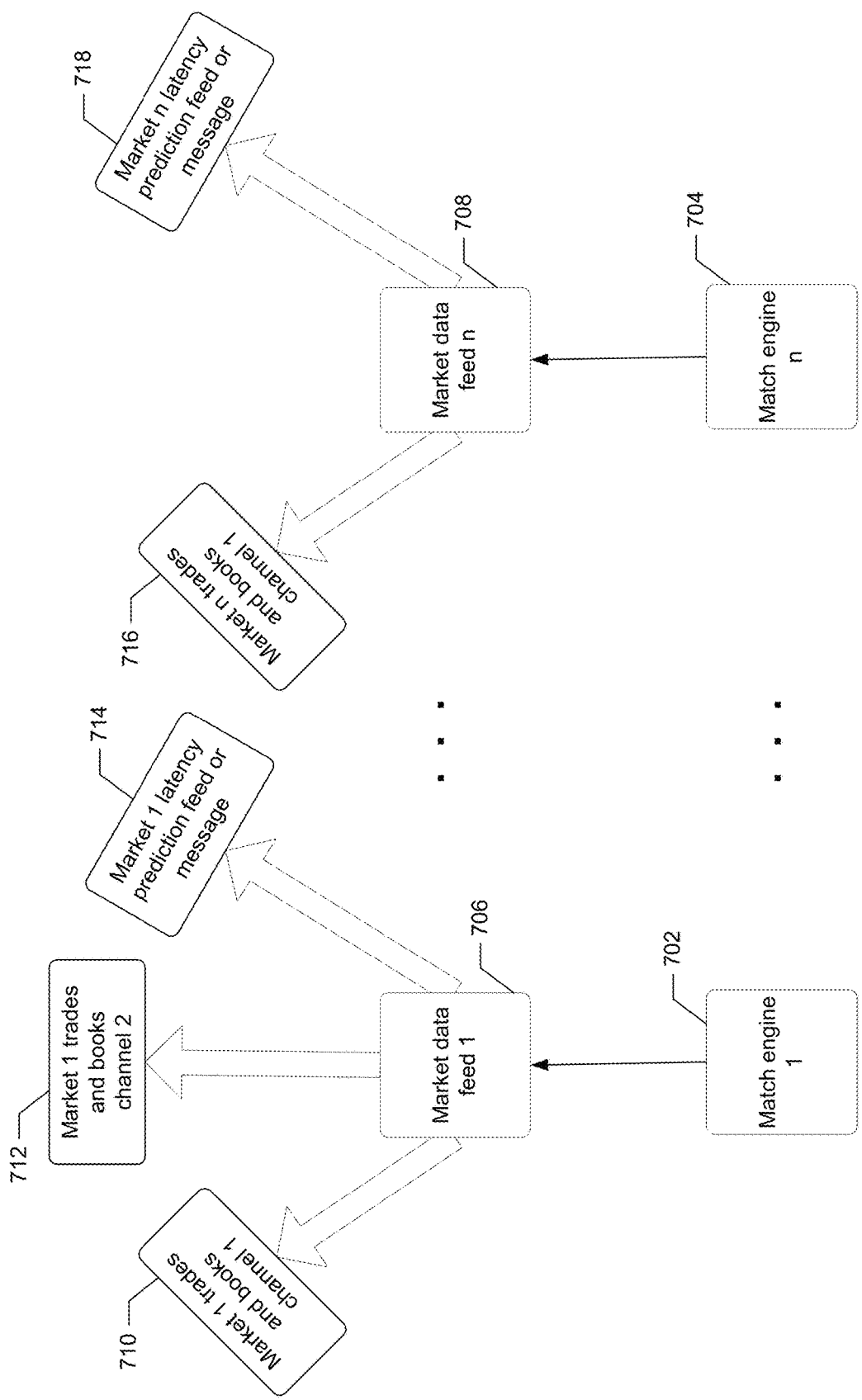
FIG. 7 depicts an illustrative embodiment of an exchange having multiple match engines and associated market data feeds for implementing the disclosed embodiments.

An exchange such as the CME may include multiple match engines, e.g., one for each market segment. FIG. 7 illustrates that an exchange may include multiple match engines 702 and 704. Each match engine matches or processes orders for a market segment. For example, match engine 702 may be the match engine for an Agricultural products market segment. Each match engine provides a market data feed that publishes market data to market participants. Market data feeds may vary depending on the associated market segment. For example, different market segments may be associated with different numbers of channels that are broadcast to market participants. As shown in FIG. 7, feed 706 broadcasts channels 710 and 712, and feed 708 broadcasts channel 716.

Some market feeds may be private, or published to a subset of market participants. The market data feeds may also be used to send specific, targeted messages to individual market participants.

The market condition prediction module 142 may output the market condition prediction for each match engine to the market data module, which can provide the market condition prediction to market participants via a market data feed. The market condition prediction may be provided as a separate market data feed message or channel. As also shown in FIG. 7, feed 706 sends a latency prediction feed 714, and feed 708 sends a latency prediction feed 718. In one embodiment, the market condition prediction may be sent via separate messages to individual market participants in response to market condition requests.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method comprising:
generating, by a processor, a plurality of latency tables based upon characteristics and processing times of at least a subset of a first plurality of messages, each having been previously processed by a transaction processing system comprising a serial arrangement of a plurality of stages, each of which comprises a queue coupled with an input of a transaction component and asynchronously processes inputs from the input queues, wherein each of the first plurality of messages is characterized by a characteristic and a calculated processing time of the message with respect to each of the plurality of stages, and storing the plurality of latency tables in a memory, wherein each of the latency tables comprises data uniquely indicative of processing times of messages having a particular characteristic; receiving, by the processor subsequent to the storing of the plurality of latency tables, a second plurality of messages not yet processed by the transaction processing system, each of which is characterized by a characteristic;
configuring, dynamically, a prediction of latency of the transaction processing system by: selecting, by the processor for each of the second plurality of messages and based upon the characteristic thereof, a latency table from the stored plurality of latency tables; simulating, by the processor, a processing time for each of the second plurality of messages based upon the selected latency table; and generating, by the processor, a latency prediction for the transaction processing system for the second plurality of messages based upon the simulated processing times for each of the second plurality of messages; and distributing, by the processor, the generated latency prediction to a corresponding participant of a plurality of participants via a data feed via a network coupled with the processor.

2. The computer implemented method of claim 1, wherein the transaction processing system includes a pre-transaction queue coupled with a transaction component, wherein the pre-transaction queue includes the second plurality of messages, and wherein the processing time of each of the subset of the first plurality of messages comprises a time the transaction component spent processing the respective message.

3. The computer implemented method of claim 1, wherein the transaction processing system includes a post-transaction queue coupled with a distribution component, wherein the post-transaction queue includes the second plurality of messages, and wherein the processing time of each of the subset of the first plurality of messages comprises a time the distribution component spent distributing the respective message.

4. The computer implemented method of claim 1, further comprising simulating the processing time for each of the second plurality of messages via a Monte Carlo simulation.

5. The computer implemented method of claim 1, wherein the characteristic includes at least one of: message type, market participant side, price, quantity, or time in force.

6. The computer implemented method of claim 5, wherein message type includes one of: new, modify, or cancel.

7. The computer implemented method of claim 5, wherein market participant side includes one of buyer or seller.

8. The computer implemented method of claim 1, further including distributing the latency prediction to a market participant via at least one of: an existing market data feed associated with the transaction processing system, a market condition prediction feed, or a market condition prediction message responsive to a market condition inquiry message.

9. The computer implemented method of claim 1, wherein the transaction processing system is one of a plurality of transaction processing systems, the method further including:
generating a plurality of latency predictions for each of the plurality of transaction processing systems; and
distributing the plurality of latency predictions to market participants via at least one of: an existing market data feed associated with each respective of the plurality of transaction processing systems, a market condition prediction feed, or a market condition prediction message responsive to a market condition inquiry message.

10. The computer implemented method of claim 1, wherein the latency prediction is a latency prediction for a message received by the transaction processing system after the second plurality of messages, and wherein the latency prediction is generated at a first time before the message is processed by the transaction processing system, the method further including:
- recording an amount of time spent by the transaction processing system processing the message; and
- comparing, at a second time after the message is processed by the transaction processing system, (i) the latency prediction for the message generated at the first time with (ii) the corresponding recorded amount of time spent by the transaction processing system processing the message.

11. The computer implemented method of claim 10, including generating an alert at a third time after the second time if (ii) is greater than (i) by a predetermined threshold.

12. A computer system comprising: a computer processor configured to:
- generate a plurality of latency tables based upon characteristics and processing times of at least a subset of a first plurality of messages, each having been previously processed by a transaction processing system comprising a serial arrangement of a plurality of stages, each of which comprises a queue coupled with an input of a transaction component and asynchronously processes inputs from the input queues, wherein each of the first plurality of messages is characterized by a characteristic and a calculated processing time of the message with respect to each of the plurality of stages, and store the plurality of latency tables in a memory coupled with the computer processor, wherein each of the latency tables comprises data uniquely indicative of processing times of messages having a particular characteristic;
- receive, subsequent to the storage of the plurality of latency tables, a second plurality of messages not yet processed by the transaction processing system, each of which is characterized by a characteristic;
- configure, dynamically, a prediction of latency of the transaction processing system via:
  - selection, for each of the second plurality of messages and based upon the characteristic thereof, a latency table from the stored plurality of latency tables;
  - simulation of a processing time for each of the second plurality of messages based upon the selected latency table; and
  - generation of a latency prediction for the transaction processing system for the second plurality of messages based upon the simulated processing times for each of the second plurality of messages; and
- distribute the generated latency prediction to a corresponding participant of a plurality of participants via a data feed via a network coupled with the computer processor.

13. The computer system of claim 12, wherein the transaction processing system includes a pre-transaction queue coupled with a transaction component, wherein the pre-transaction queue includes the second plurality of messages, and wherein the processing time of each of the subset of the first plurality of messages comprises a time the transaction component spent processing the respective message.

14. The computer system of claim 12, wherein the transaction processing system includes a post-transaction queue coupled with a distribution component, wherein the post-transaction queue includes the second plurality of messages, and wherein the processing time of each of the subset of the first plurality of messages comprises a time the distribution component spent distributing the respective message.

15. The computer system of claim 12, further comprising simulating the processing time for each of the second plurality of messages via a Monte Carlo simulation.

16. The computer system of claim 12, wherein the characteristic includes at least one of: message type, market participant side, price, quantity, or time in force.

17. The computer system of claim 16, wherein message type includes one of: new, modify, or cancel.

18. The computer system of claim 16, wherein market participant side includes one of buyer or seller.

19. The computer system of claim 12, wherein the computer processor is further configured to distribute the generated latency prediction to a market participant via at least one of: an existing market data feed associated with the transaction processing system, a market condition prediction feed, or a market condition prediction message responsive to a market condition inquiry message.

20. The computer system of claim 12, wherein the transaction processing system is one of a plurality of transaction processing systems, the computer processor being further configured to:
- generate a plurality of latency predictions for each of the plurality of transaction processing systems; and
- distribute the plurality of latency predictions to market participants via at least one of: an existing market data feed associated with each respective of the plurality of transaction processing systems, a market condition prediction feed, or a market condition prediction message responsive to a market condition inquiry message.

21. The computer system of claim 12, wherein the latency prediction is a latency prediction for a message received by the transaction processing system after the second plurality of messages, and wherein the latency prediction is generated at a first time before the message is processed by the transaction processing system, the computer processor being further configured to:
- record an amount of time spent by the transaction processing system processing the message; and
- compare, at a second time after the message is processed by the transaction processing system, (i) the latency prediction for the message generated at the first time with (ii) the corresponding recorded amount of time spent by the transaction processing system processing the message.

22. The computer system of claim 21, wherein the computer processor is further configured to generate an alert at a third time after the second time if (ii) is greater than (i) by a predetermined threshold.

23. A computer system comprising:
- means for generating a plurality of latency tables based upon characteristics and processing times of at least a subset of a first plurality of messages, each having been previously processed by a transaction processing system comprising a serial arrangement of a plurality of stages, each of which comprises a queue coupled with an input of a transaction component and asynchronously processes inputs from the input queues, wherein each of the first plurality of messages is characterized by a characteristic and a calculated processing time of the message with respect to each of the plurality of stages, and storing the plurality of latency tables in a memory, wherein each of the latency tables comprises data uniquely indicative of processing times of messages having a particular characteristic;
- means for receiving, subsequent to the storing of the plurality of latency tables, a second plurality of messages not yet processed by the transaction processing system, each of which is characterized by a characteristic;

means for configuring, dynamically, a prediction of latency of the transaction processing system by:

selecting, for each of the second plurality of messages and based upon the characteristic thereof, a latency table from the stored plurality of latency tables;

simulating a processing time for each of the second plurality of messages based upon the selected latency table; and generating a latency prediction for the transaction processing system for the second plurality of messages based upon the simulated processing times for each of the second plurality of messages; and means for distributing the generated latency prediction to a corresponding participant of a plurality of participants via a data feed via a network.

\* \* \* \* \*